United States Patent
Bastien et al.

(10) Patent No.: US 10,399,435 B2
(45) Date of Patent: Sep. 3, 2019

(54) SIDE-BY-SIDE OFF-ROAD VEHICLE HAVING A FUEL VAPOR CONTAINMENT SYSTEM

(71) Applicant: BOMBARDIER RECREATIONAL PRODUCTS INC., Valcourt (CA)

(72) Inventors: Karine Bastien, Bromont (CA); Christian Girouard, Bromont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/912,939

(22) Filed: Mar. 6, 2018

(65) Prior Publication Data

US 2019/0176613 A1 Jun. 13, 2019

Related U.S. Application Data

(60) Provisional application No. 62/597,112, filed on Dec. 11, 2017.

(51) Int. Cl.
*B60K 15/035* (2006.01)
*F02M 25/08* (2006.01)

(52) U.S. Cl.
CPC ........... *B60K 15/03504* (2013.01); *B60K 2015/03514* (2013.01); *F02M 25/089* (2013.01); *F02M 25/0836* (2013.01); *F02M 25/0854* (2013.01)

(58) Field of Classification Search
CPC .... B60K 15/03504; B60K 2015/03514; F02M 25/08; F02M 25/0836; F02M 25/0854; F02M 25/089

USPC .................................................. 123/518, 519
See application file for complete search history.

(56) References Cited

U.S. PATENT DOCUMENTS

| | | |
|---|---|---|
| 8,251,048 B2 | 8/2012 | Kusa |
| 8,870,226 B2 | 10/2014 | Inaoka et al. |
| 9,022,008 B2 | 5/2015 | Hirukawa |
| 9,133,797 B2 | 9/2015 | Shomura et al. |
| 9,187,143 B2 | 11/2015 | Inaoka et al. |
| 9,809,110 B2 | 11/2017 | Nakamura et al. |
| 2007/0215123 A1* | 9/2007 | Ito ..................... F02M 25/0872 123/519 |
| 2016/0347137 A1* | 12/2016 | Despres-Nadeau .... B60G 3/202 |
| 2017/0028881 A1* | 2/2017 | Proulx ................... B60N 2/305 |
| 2017/0029035 A1* | 2/2017 | Dube .................. B60K 15/063 |
| 2017/0029036 A1* | 2/2017 | Proulx ..................... B60N 2/24 |
| 2017/0029042 A1* | 2/2017 | Simard ................. B60R 11/06 |
| 2017/0089303 A1 | 3/2017 | Kurata et al. |

(Continued)

*Primary Examiner* — Erick R Solis
(74) *Attorney, Agent, or Firm* — BCF LLP

(57) ABSTRACT

A side-by-side off-road vehicle has a frame defining at least in part a cockpit area, and a power pack area being disposed rearward of the cockpit area. The vehicle has driver and passenger seats connected to the frame and disposed in the cockpit area on first and second sides of a longitudinal centerline of the vehicle. The vehicle further has a power pack connected to the frame and disposed at least in part in the power pack area. A partition is connected to the frame and extends laterally across the longitudinal centerline of the vehicle. The partition separates the cockpit area from the power pack area. The power pack includes an internal combustion engine and a fuel vapor containment system operatively connected to the engine. The fuel vapor containment system includes a fuel evaporation canister, and the canister is supported at least in part by the partition.

20 Claims, 21 Drawing Sheets

(56) References Cited

U.S. PATENT DOCUMENTS

| | | |
|---|---|---|
| 2017/0159617 A1 | 6/2017 | Hamamura et al. |
| 2017/0174027 A1* | 6/2017 | Mailhot ............... B62D 23/005 |
| 2018/0179991 A1* | 6/2018 | Oakden-Graus ..... F02M 25/089 |
| 2018/0222311 A1* | 8/2018 | Toupin ................ F16H 57/0475 |
| 2018/0354356 A1* | 12/2018 | Reedy ................. B60K 15/035 |
| 2019/0048832 A1* | 2/2019 | Reedy ................ F02M 25/0872 |
| 2019/0061518 A1* | 2/2019 | Hayashi ............... B60K 15/063 |

\* cited by examiner

SIDE-BY-SIDE OFF-ROAD VEHICLE HAVING A FUEL VAPOR CONTAINMENT SYSTEM

CROSS-REFERENCE TO RELATED APPLICATION

The present application claims priority to U.S. Provisional Patent Application Ser. No. 62/597,112, filed Dec. 11, 2017, entitled "Side-by-side Off-road Vehicle having a Fuel Vapor Containment System", which is incorporated by reference herein in its entirety.

FIELD OF TECHNOLOGY

The present technology relates to a side-by-side off-road vehicle having a fuel vapor containment system.

BACKGROUND

There exist various types of vehicles used mainly in off-road conditions. One such type is the side-by-side off-road vehicle. The name "side-by-side" refers to the seating arrangement of the vehicle in which the driver and passenger(s) are seated side-by-side. Some side-by-side off-road vehicles also have a second row of seats to accommodate one or more additional passengers. These vehicles typically have a frame forming a cockpit area in which the seats are disposed, a roll cage and power pack area. These vehicles also have a steering wheel, a power pack including an internal combustion engine disposed in the power pack area, and ground-engaging wheels. These vehicles have a compact frame in order to minimize its weight and to improve its overall performance. As such, the configuration and positioning of each one of the components in a side-by-side off-road vehicle may therefore be selected in order to provide such a compact frame.

In recent years, some government authorities have required that side-by-side off-road vehicles be equipped with a fuel vapor containment system to reduce emission of fuel vapors into the atmosphere. Such a fuel vapor containment system is fluidly connected between the fuel tank and the air intake system of the engine, and includes a fuel vapor evaporation canister that accumulates at least some of the fuel vapors emitted by the liquid fuel contained in the fuel tank. When the engine is in operation, the fuel vapor containment system can be configured so that the fuel vapors contained in the canister are purged from the canister into the air intake system and consumed by the engine.

Since the frame of a side-by-side off-road vehicle is compact and already supports various components, installing a fuel vapor containment system in a side-by-side off-road vehicle becomes challenging. Nevertheless, there is a desire for having a fuel vapor containment system within a side-by-side off-road vehicle.

SUMMARY

It is an object of the present technology to ameliorate at least some of the inconveniences present in the prior art.

According to one aspect of the present technology, there is provided a side-by-side off-road vehicle having a frame defining at least in part a cockpit area and a power pack area. The power pack area is disposed rearward of the cockpit area. The side-by-side off-road vehicle further has a driver seat connected to the frame and disposed in the cockpit area. The driver seat is disposed at least in part on a first side of a longitudinal centerline of the vehicle. The side-by-side off-road vehicle further has a passenger seat connected to the frame and disposed in the cockpit area. The passenger seat is disposed at least in part on a second side of the longitudinal centerline of the vehicle. The side-by-side off-road vehicle further has a power pack connected to the frame and disposed at least in part in the power pack area. A partition is connected to the frame and extends laterally across the longitudinal centerline of the vehicle. The partition separates the cockpit area from the power pack area. The power pack includes an internal combustion engine and a fuel vapor containment system operatively connected to the engine. The fuel vapor containment system includes a fuel evaporation canister, and the canister is supported at least in part by the partition.

In some implementations, the canister is mounted to the partition.

In some implementations, the canister is mounted to the partition by a bracket.

In some implementations, the canister is a carbon canister. The canister contains activated carbon which has capabilities of adsorbing and desorbing hydrocarbons and/or other components contained in the fuel vapors.

In some implementations, the partition includes a recess arranged and dimensioned for receiving at least partially the canister.

In some implementations, the power pack further includes a fuel tank fluidly connected to the fuel vapor containment system, the fuel tank is disposed rearward of the partition, at least a majority of the fuel tank is disposed on the second side of the longitudinal centerline of the vehicle, and the canister is disposed on the second side of the longitudinal centerline of the vehicle.

In some implementations, the canister is disposed vertically higher than the at least a majority of the fuel tank.

In some implementations, the power pack further includes an exhaust pipe operatively connected to the engine, at least a majority of the exhaust pipe extends on the first side of the longitudinal centerline of the vehicle, and the canister is disposed on the second side of the longitudinal centerline of the vehicle.

In some implementations, the canister is disposed vertically higher than the at least a majority of the exhaust pipe.

In some implementations, the power pack further includes an air intake system operatively connected to the engine, at least a majority of the air intake system extends on the second side of the longitudinal centerline of the vehicle, and the canister is disposed on the second side of the longitudinal centerline of the vehicle.

In some implementations, the air intake system includes an air filter assembly having an inlet, and the canister is disposed laterally outwardly of the air filter assembly.

In some implementations, the canister is disposed laterally outwardly of the inlet of the air filter assembly.

In some implementations, the side-by-side off-road vehicle further includes a cargo box connected to the frame and disposed above the power pack area, and the canister is disposed longitudinally between the cargo box and the partition.

In some implementations, the bracket is connected between the frame and the partition.

In some implementations, the bracket includes a plurality of interconnected plates forming a housing for the canister.

In some implementations, the power pack further includes an exhaust pipe operatively connected to the engine, at least a majority of the exhaust pipe extends on the second side of the longitudinal centerline of the vehicle, and the canister is disposed on the first side of the longitudinal centerline of the vehicle.

In some implementations, the canister is disposed vertically higher than the at least a majority of the exhaust pipe.

In some implementations, the power pack further includes an air intake system operatively connected to the engine, at least a majority of the air intake system extends on the first side of the longitudinal centerline of the vehicle, and the canister is disposed on the first side of the longitudinal centerline of the vehicle.

In some implementations, the side-by-side off-road vehicle further includes a rear suspension assembly pivotally connected to the frame and disposed on the first side of the longitudinal centerline of the vehicle, and the canister is disposed laterally outwardly of the rear suspension assembly.

In some implementations, the driver seat and the passenger seat are portions of a bench seat.

In some implementations, the fuel vapor containment system has a vent inlet tube fluidly connected to the fuel evaporation canister, and an end of the vent inlet tube extends inside a member of the frame.

One of the objects of the present technology is to use some of the remaining room inside the power pack area of the frame to dispose at least some of the components of the fuel vapor containment system inside the power pack area and proximate to the fuel tank and the air intake system in order to reduce the length of the conduits required to fluidly connect the fuel vapor containment system to the fuel tank and air intake system.

In vehicles where the engine is mounted at the rear, the fuel tank is generally mounted at the rear of the vehicle behind and/or under the driver and passenger seats, and the engine air intake is typically disposed behind the driver or passenger seats. By having the fuel evaporation canister supported at least in part by the partition separating the cockpit area and the power pack area, the canister can be disposed proximate to the fuel tank and the air intake system while being distanced from the engine and the exhaust of the vehicle, which become hot during operation of the vehicle. As a result, the mechanical packaging of the fuel evaporation canister, the fuel tank and the air intake system is compact, requires conduits of reduced length between the canister, the fuel tank and the air intake system. In addition, the canister receives only fraction of the heat that radiates from the engine and the exhaust.

For purposes of this application, terms related to spatial orientation such as forward, rearward, upwardly, downwardly, upper, lower, left, and right, are as they would normally be understood by a driver of the side-by-side off-road vehicle sitting in the driver seat in a normal riding position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying figures and the appended claims.

BRIEF DESCRIPTION OF THE FIGURES

For a better understanding of the present technology, as well as other aspects and further features thereof, reference is made to the following description which is to be used in conjunction with the accompanying figures, where.

DETAILED DESCRIPTION

Figure 1:
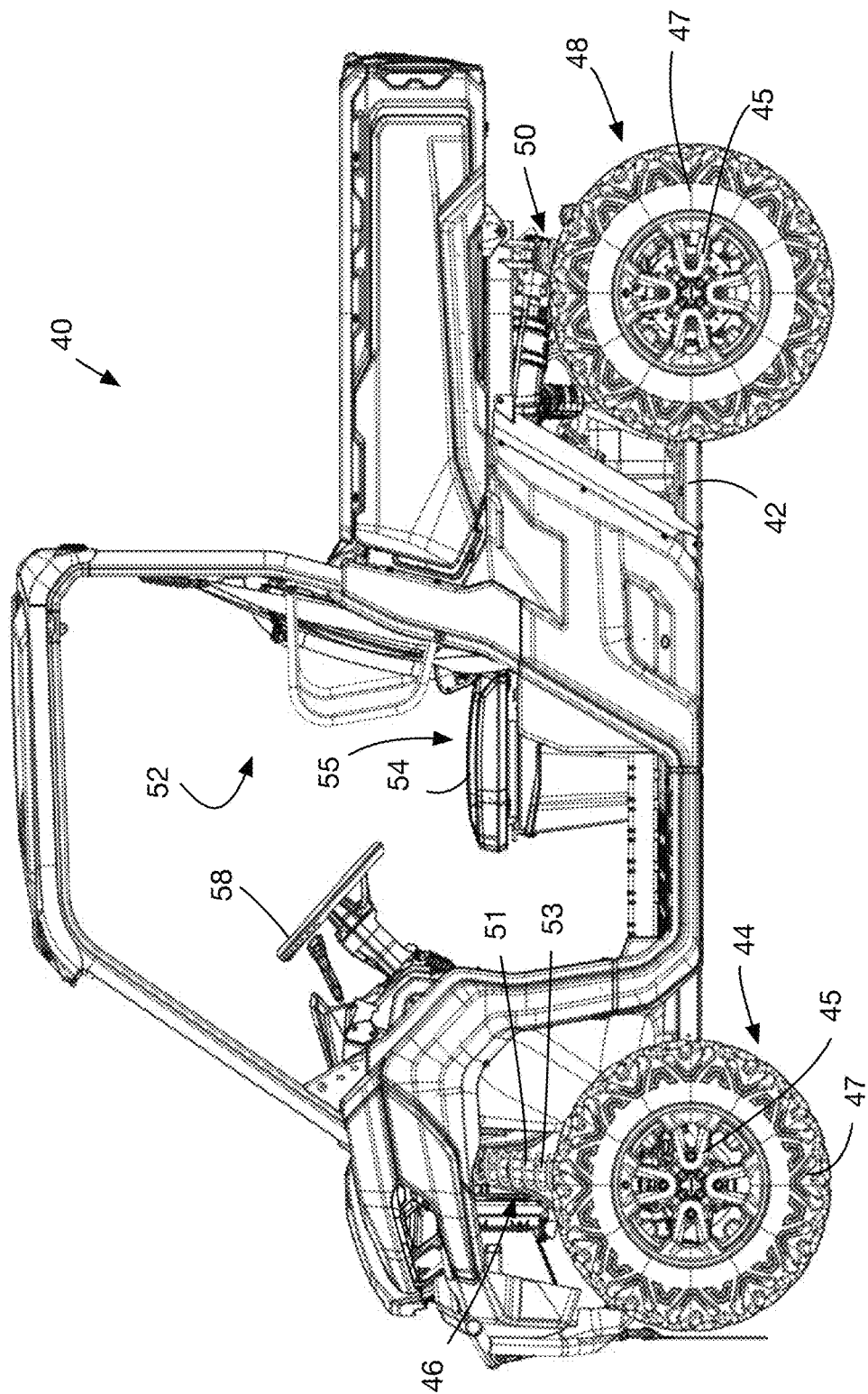
FIG. 1 is a left side elevation view of a side-by-side off-road vehicle according to a first implementation of the present technology.

Referring to FIGS. 1 to 11, the present technology will be described with respect to a first implementation of a four-wheel side-by-side off-road vehicle 40 having two seats 54, 56 disposed side-by-side and a steering wheel 58. The present technology will also be described with respect to a second implementation of a four-wheel side-by-side off-road vehicle 340 illustrated in FIGS. 12 to 14, and with respect to a third implementation of a four-wheel side-by-side off-road vehicle 640 illustrated in FIGS. 15 to 20.

Referring to FIGS. 1 to 11, the vehicle 40 has a frame 42, two front wheels 44 connected to a front of the frame 42 by front suspension assemblies 46, and two rear wheels 48 connected to the frame 42 by rear suspension assemblies 50. The suspension assemblies 46, 50 are pivotally connected to the frame 42. Each one of the suspension assemblies 46, 50 has a coil spring 51 and a shock absorber 53. Each one of the front and rear wheels 44, 48 has a rim 45 and a tire 47 thereon. The rims 45 and tires 47 of the front wheels 44 may differ in size from the rims and tires of the rear wheels 48. Ground engaging members other than wheels 44, 48 are contemplated for the vehicle 40, such as tracks or skis. In addition, although four ground engaging members are illustrated in the accompanying Figures, the vehicle 40 could include more or less than four ground engaging members. Furthermore, different combinations of ground engaging members, such as tracks used in combination with skis, are contemplated.

Figure 4:
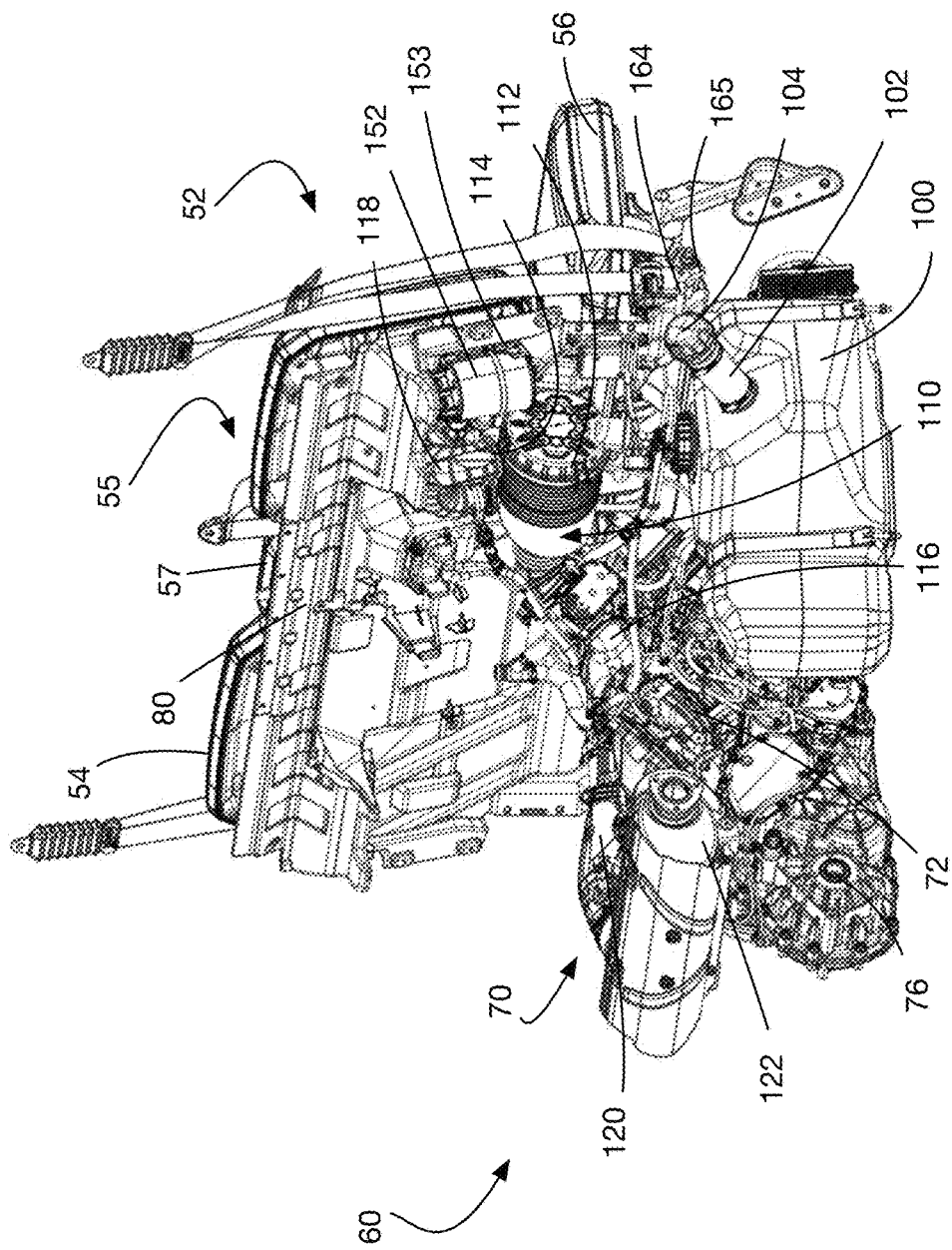
FIG. 4 is a perspective view taken from a top, rear, right side of the driver and passenger seats, the partition and the power pack of the vehicle of FIG. 1.

The frame 42 defines a central cockpit area 52 inside which are disposed a driver seat 54 and a passenger seat 56. In the present implementations, the driver seat 54 is disposed on a left side of the vehicle 40 and the passenger seat 56 is disposed on a right side of the vehicle 40. The driver seat 54 and the passenger seat 56 are portions of a bench seat 55 (FIG. 1) further including a central seat portion 57 (FIG. 4). The bench seat 55 provides room for one driver sitting in the driver seat 54, and two passengers, one sitting on the passenger seat 56 and the other sitting in the central seat portion 57. The vehicle 40 has a longitudinal centerline 220. The right side of the longitudinal centerline 220 corresponds to a passenger side 222 of the vehicle 40, while the left side of the longitudinal centerline 220 corresponds to a driver side 224 of the vehicle 40. However, it is contemplated that the driver seat 54 could be disposed on the right side of the longitudinal centerline 220 and that the passenger seat 56 could be disposed on the left side of the longitudinal centerline 220.

Figure 2:
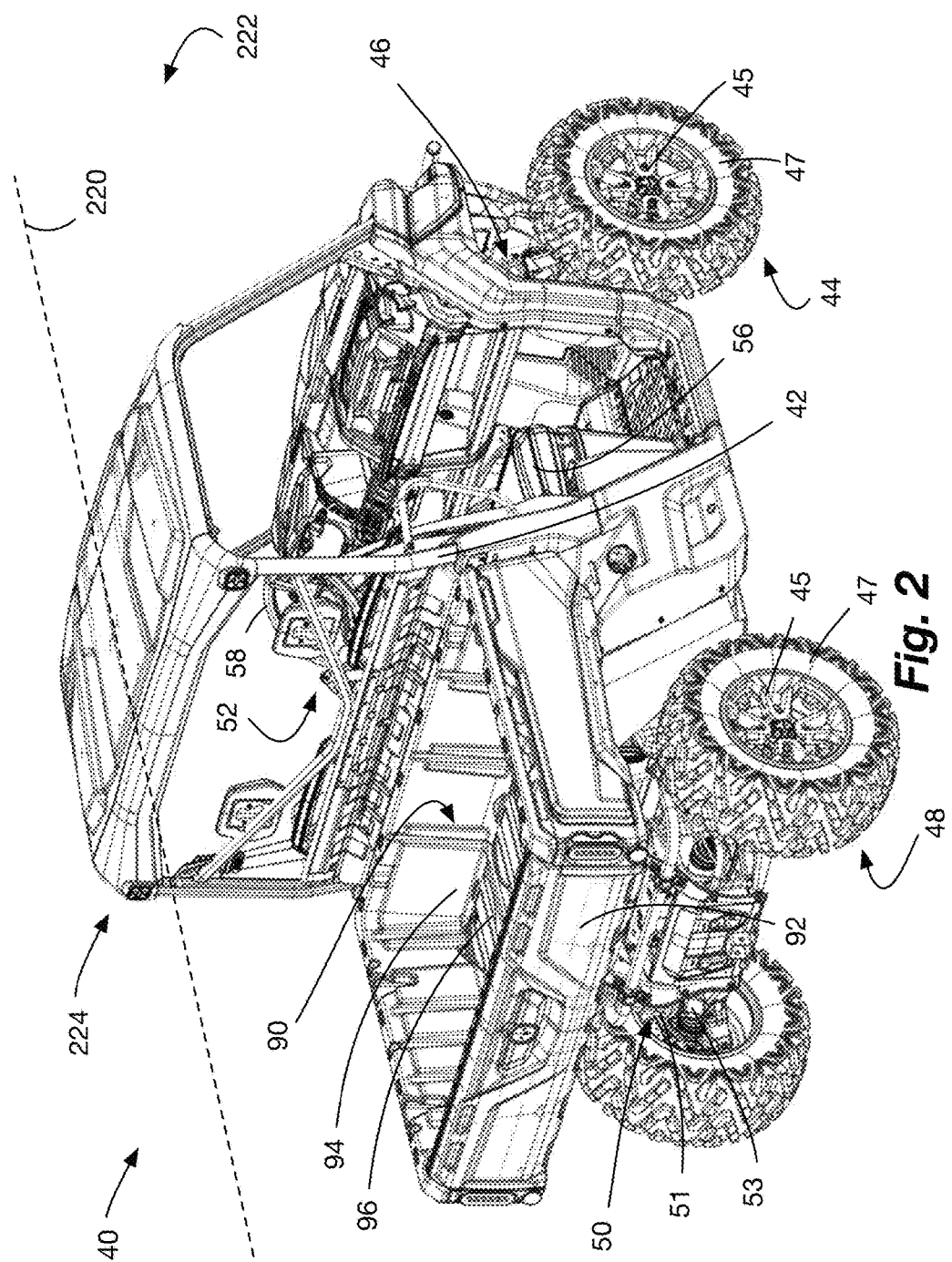
FIG. 2 is a perspective view taken from a top, rear, right side of the vehicle of FIG. 1.
Figure 5:
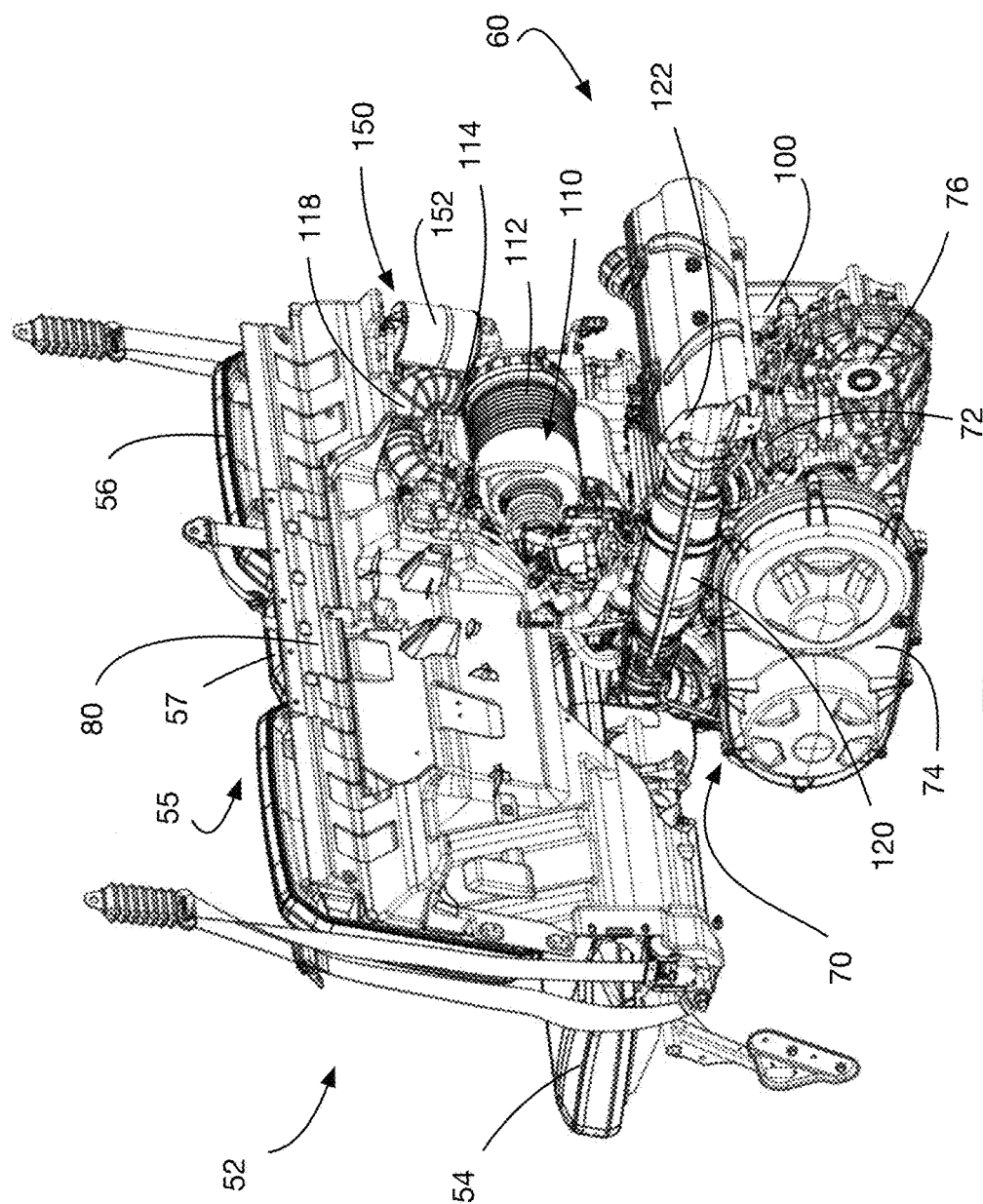
FIG. 5 is a perspective view taken from a top, rear, left side of the driver and passenger seats, the partition and the power pack of FIG. 4.

Referring to FIGS. 1 and 2, the steering wheel 58 is disposed in front of the driver seat 54. The steering wheel 58 is used to turn the front wheels 44 to steer the vehicle 40. With reference to FIGS. 3A to 5, the frame 42 also defines a power pack area 60 rearward of the cockpit area 52. A power pack 70 is connected to the frame 42 in the power pack area 60. The power pack 70 includes an internal combustion engine 72 connected to a continuously variable transmission (CVT) 74 disposed on a left side of the engine 72 (FIG. 5). The CVT 74 is on the driver side 224 of the vehicle 40. The CVT 74 is operatively connected to the front wheels 44 by a differential (not shown) and to the rear wheels 48 by a transaxle 76 to transmit torque from the engine 72 to the front and rear wheels 44, 48 to propel the vehicle 40. An engine control unit (ECU) (not shown) electronically controls different parameters and operating conditions of the engine 72 and of several components of the power pack 70. The power pack 70 also includes a fuel tank 100, an air intake system 110 and an exhaust pipe 120 that are all operatively connected to the engine 72. The power pack 70 also includes a fuel vapor containment system 150 that is fluidly connected between the fuel tank 100 and the air intake system 110. The fuel vapor containment system 150 will be described in more detail below. It is contemplated that, in some implementations, some components of the power pack 70 could be located outside of the power pack area 60. For example and as will be described with respect to the vehicle 640 illustrated in FIGS. 15 to 20, the fuel tank 100 is located forward of the passenger seat 56, which is outside of the power pack area 60 of the vehicle 640.

A partition 80 is connected to the frame 42. The partition 80 extends laterally across the longitudinal centerline 220 of the vehicle 40. The partition 80 separates the cockpit area 52 from the power pack area 60. In some implementations, the partition 80 is made of molded polymeric material. In yet other implementations, the partition 80 is made of a plurality of interconnected components.

Referring now to FIGS. 3A to 8 illustrating the vehicle 40, the fuel tank 100 is disposed rearward of the partition 80. A majority of the fuel tank 100 is also disposed rearward of the passenger seat 56. In addition, the fuel tank 100 is disposed entirely below the passenger seat 56, and on the passenger side 222 of the vehicle 40. A filler neck 102 having a cap 104 extends upwardly and rightwardly from the fuel tank 100. The fuel tank 100 is disposed on a right side of the engine 72.

Referring to FIGS. 4 and 5, the air intake system 110 includes an air filter assembly 112 having an inlet 114. An inverted U-shaped duct 118 fluidly connects the inlet 114 to the air filter assembly 112. The inlet 114 faces downwardly towards the air filter assembly 112. The air filter assembly 112 extends laterally and is disposed on the passenger side 222 of the vehicle 40 behind the partition 80 and the passenger seat 56. When the engine 72 is in operation, fresh air is drawn into the air filter assembly 112 via the inlet 114, and the fresh air is filtered before entering the engine 72. Such drawing of fresh air into the air filter assembly 112 creates a flow of fresh air proximate to the inlet 114. The air intake system 110 also includes an intake manifold 116 (FIG. 4) fluidly connected to the engine 72.

Referring to FIG. 5, the exhaust pipe 120 extends on the driver side 224 of the vehicle 40, on a left side of the engine 72 and above the CVT 74. A laterally extending muffler 122 is fluidly connected to the exhaust pipe 120. The muffler 122 is disposed behind the engine 72 and is vertically higher than the CVT 74. When the engine 72 is in operation, the exhaust pipe 120 and the muffler 122 become hot as the hot exhaust gases from the engine 72 flow therein and on to the atmosphere.

Referring to FIGS. 3A to 11, the fuel vapor containment system 150 as implemented in the vehicle 40 will be described. The fuel vapor containment system 150 includes a fuel evaporation canister 152 that accumulates at least some of the fuel vapors emitted by the liquid fuel contained in the fuel tank 100. The fuel evaporation canister 152 is a carbon canister containing activated carbon which has capabilities of adsorbing and desorbing hydrocarbons and/or other components contained in the fuel vapors. The fuel evaporation canister 152 could also include a mix of different adsorbent and desorbent materials in order to remove specific components or specific compounds from the fuel vapors.

Figure 6:
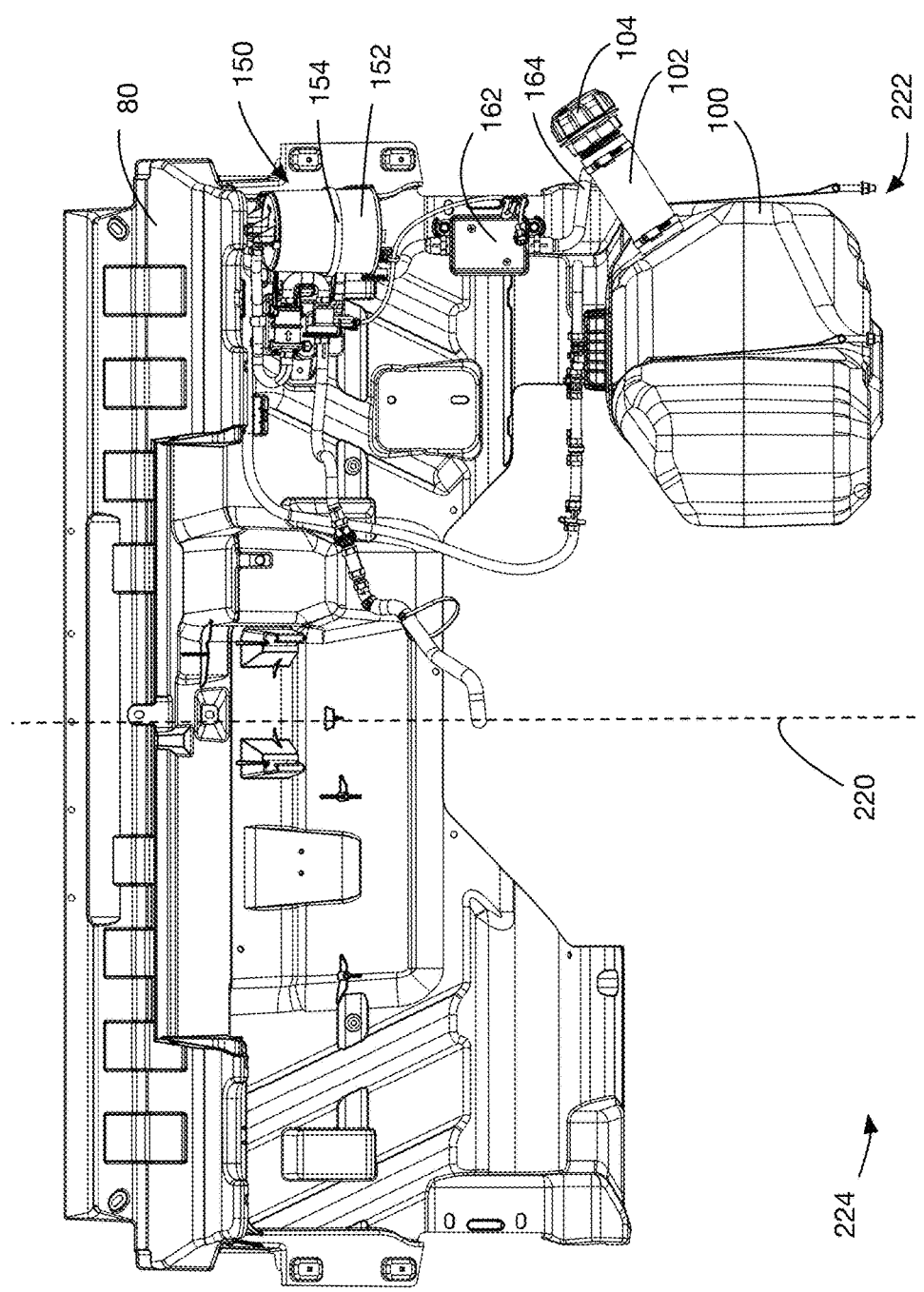
FIG. 6 is a rear elevation view of the partition, the fuel vapor containment system and the fuel tank of the vehicle of FIG. 1.
Figure 7:
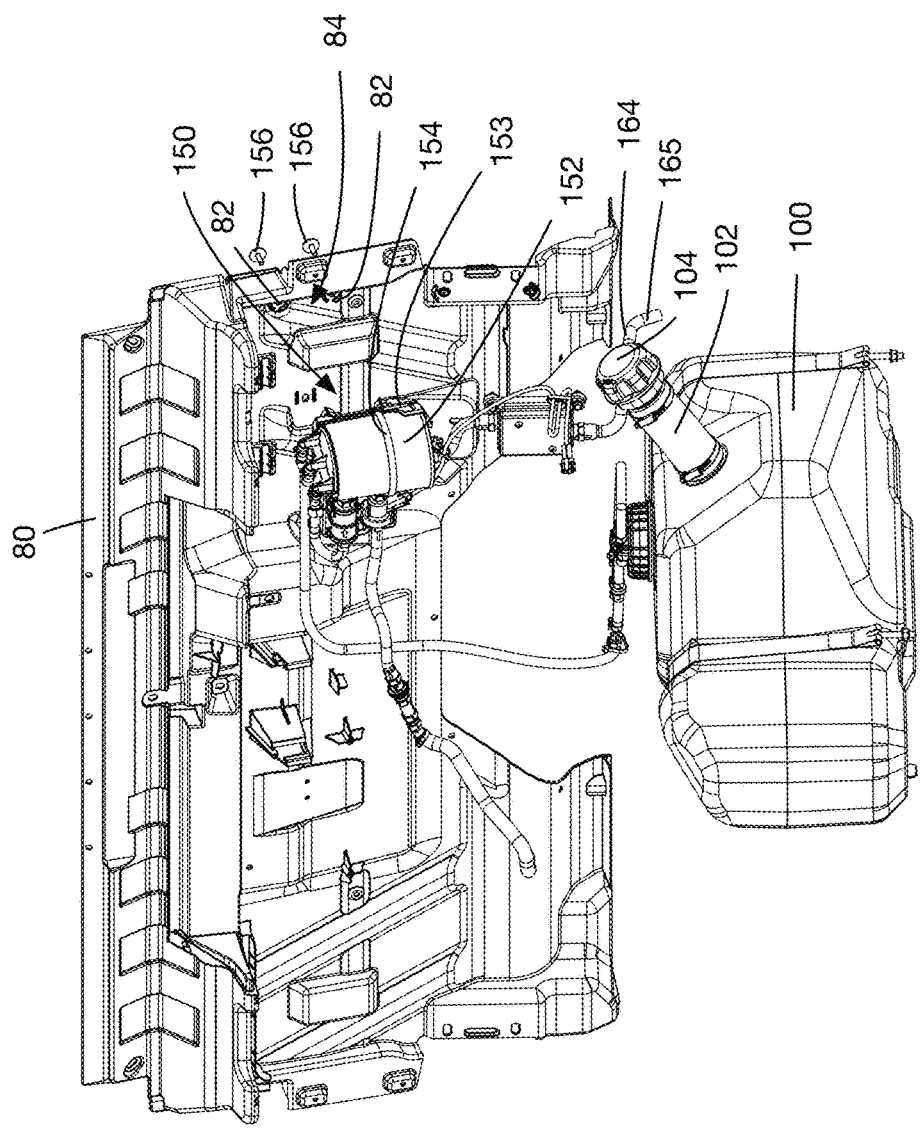
FIG. 7 is a perspective and partially exploded view taken from a rear, right side of the partition, the fuel vapor containment system and the fuel tank of FIG. 6.

Referring to FIGS. 4 to 7, the fuel evaporation canister 152 is mounted to the partition 80 via a bracket 153, a collar clamp 154, and fasteners 156. A front portion and the bottom of the fuel evaporation canister 152 abut the bracket 153. The collar clamp 154 is mounted to the bracket 153 and extends around the sides and the rear portion of the fuel evaporation canister 152. The partition 80 has holes 82 (FIG. 7) through which the fasteners 156 can extend to fasten the bracket 153 so as to mount the fuel evaporation canister 152 to the partition 80. Other fasteners, bracket and/or clamps could be used to mount the fuel evaporation canister 152 to the partition 80. The partition 80 also has a recess 84 (FIG. 7) that is arranged and dimensioned for receiving the front portion of the fuel evaporation canister 152. The recess 84 extends towards the cockpit area 52 and is formed during the molding of the partition 80. As the front portion of the canister 152 is received within the recess 84, less room inside the power pack area 60 is taken by the canister 152 compared to implementations in which the canister 152 would be mounted to a partition 80 having no such recess 84. As best seen in FIG. 6, the fuel evaporation canister 152 is disposed on the passenger side 222 of the vehicle 40, above the fuel tank 100, the filler neck 102 and the cap 104.

Referring to FIGS. 4 and 5, the fuel evaporation canister 152 is disposed laterally outwardly (i.e. to the right) of the air filter assembly 112 and the inlet 114. As mentioned above, when the engine 72 is in operation, fresh air that is drawn into the air filter assembly 112 via the inlet 114 creates a flow of fresh air proximate to the inlet 114, and this flow of fresh air may assist in keeping the fuel evaporation canister 152 cool.

As best seen in FIG. 5, the fuel evaporation canister 152 is also disposed vertically higher than the exhaust pipe 120 and the muffler 122. In addition, since the exhaust pipe 120 extends on the driver side 224 of the vehicle 40 and the fuel evaporation canister 152 is disposed on the passenger side 222 of the vehicle 40, the fuel evaporation canister 152 receives only a fraction of the heat radiating from the exhaust pipe 120. Similarly, since the muffler 122 extends behind the engine 72 and the fuel evaporation canister 152 is disposed in front of and vertically higher than the engine 72, the fuel evaporation canister 152 receives only a fraction of the heat radiating from the muffler 122.

Figure 8:
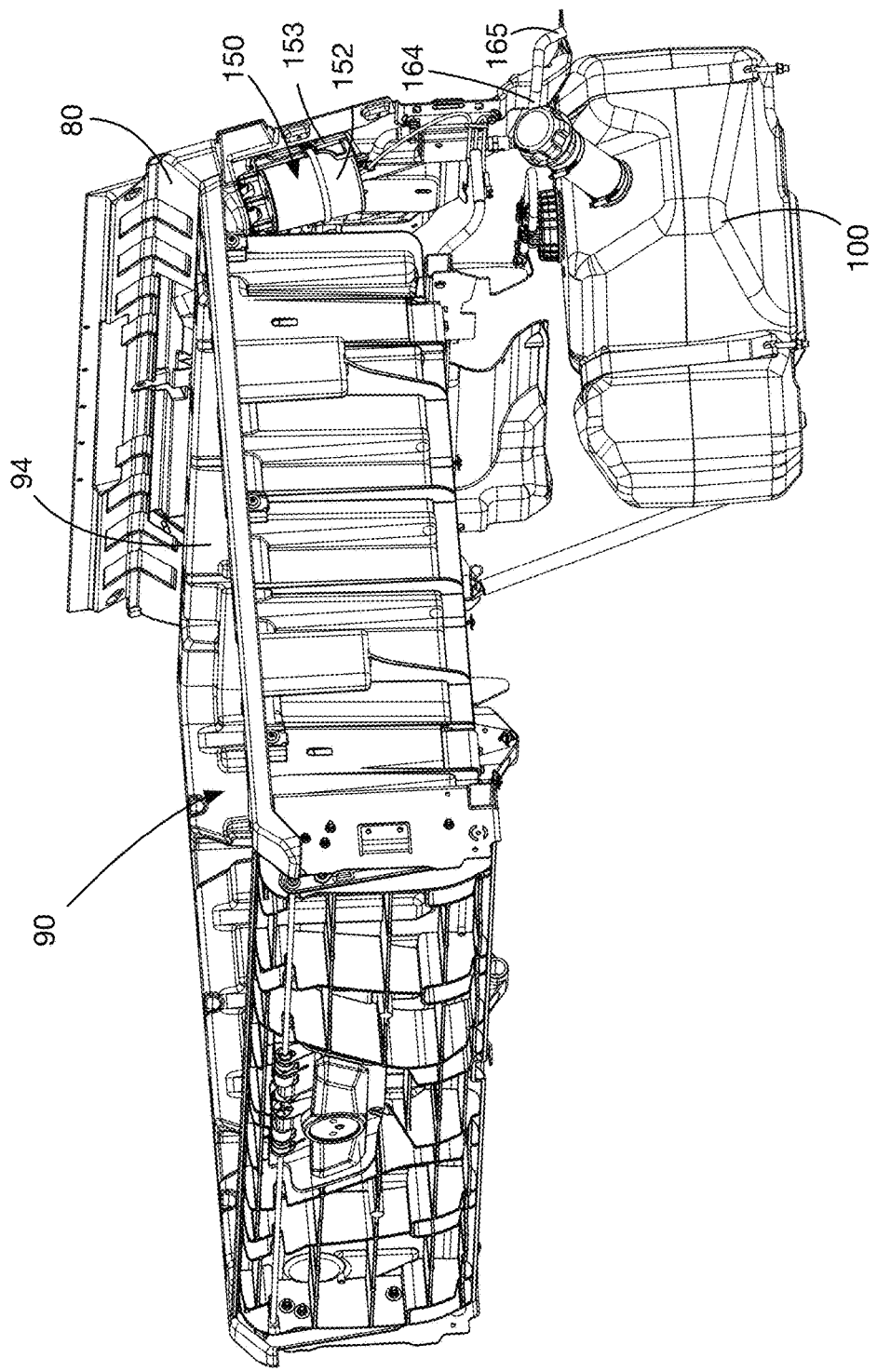
FIG. 8 is a perspective view taken from a top, rear, right side of the partition, the fuel vapor containment system and the fuel tank of FIG. 6, with the cargo box of the vehicle of FIG. 1.

Referring to FIGS. 2 and 8, the vehicle 40 further includes a cargo box 90 connected to the frame 42 above the power pack area 60. The cargo box 90 has a tail gate 92, a front wall 94 and a bed 96. As best seen in FIG. 8, the fuel evaporation canister 152 is disposed longitudinally between the cargo box 90 and the partition 80. More particularly, the fuel evaporation canister 152 is disposed longitudinally between the front wall 94 and the partition 80. The fuel evaporation canister 152 is vertically higher than the bed 96 of the cargo box 90.

Figure 9:
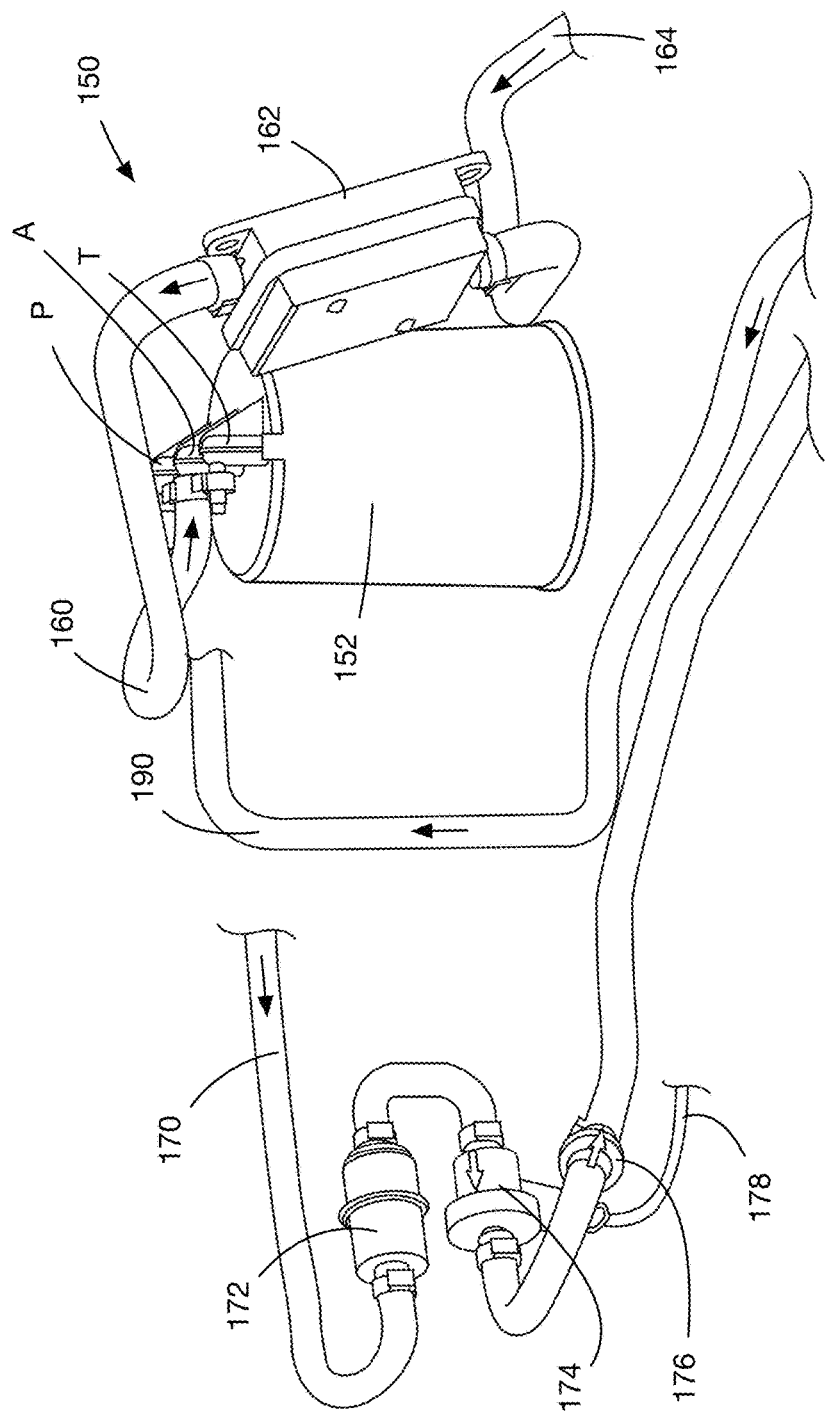
FIG. 9 is a perspective, partially sectioned, view of a portion of the fuel vapor containment system of FIG. 6.
Figure 10:
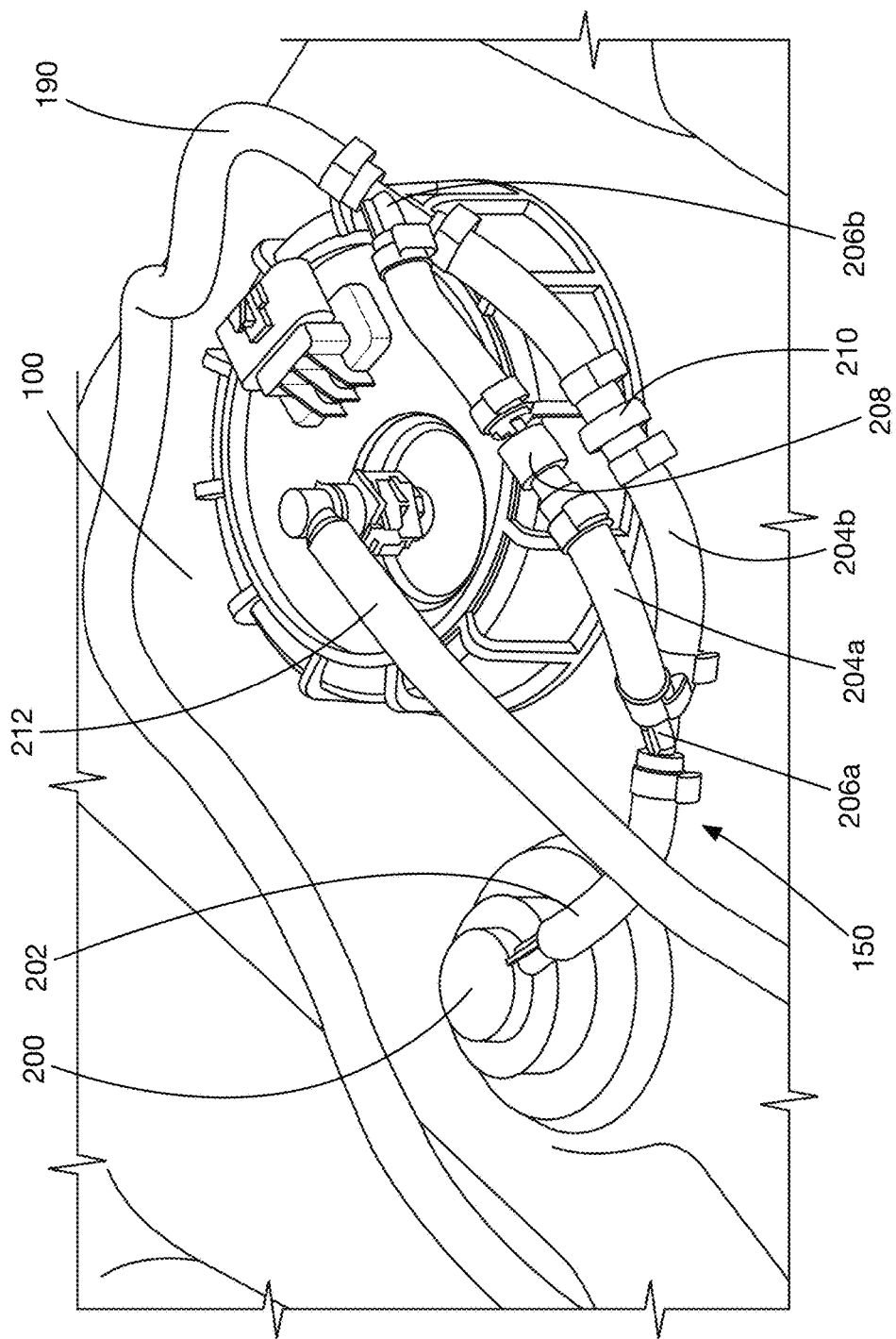
FIG. 10 is a close-up perspective, partially sectioned, view of a portion of the fuel vapor containment system and the fuel tank of FIG. 6.
Figure 11:
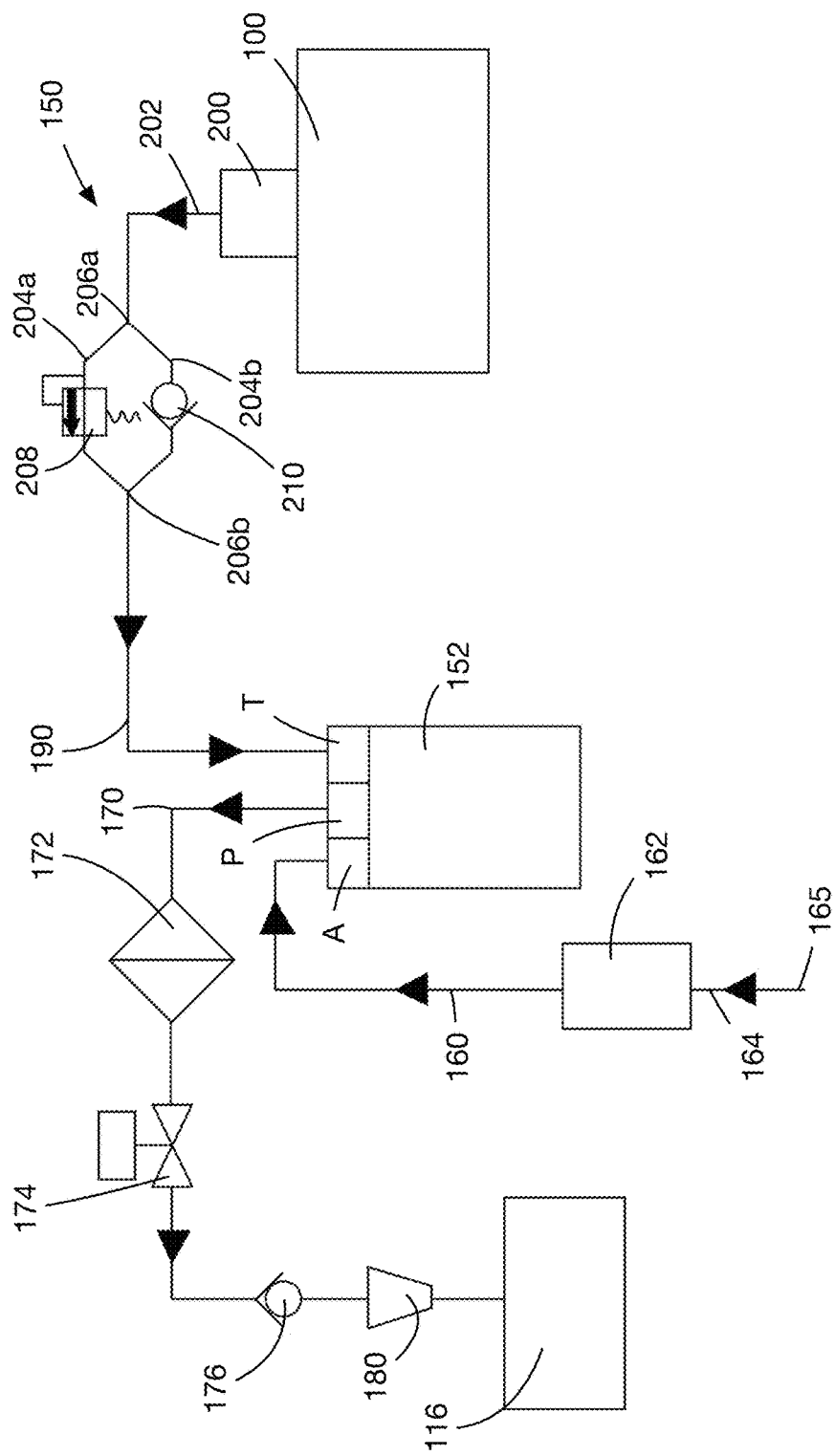
FIG. 11 is a schematic view of the fuel vapor containment system and the fuel tank of FIG. 6.

Referring to FIGS. 9 to 11, the fuel vapor containment system 150 will be described in more detail. Arrows show schematically the flow of fresh air, fuel vapors and purged air through the fuel vapor containment system 150.

Figure 3A:
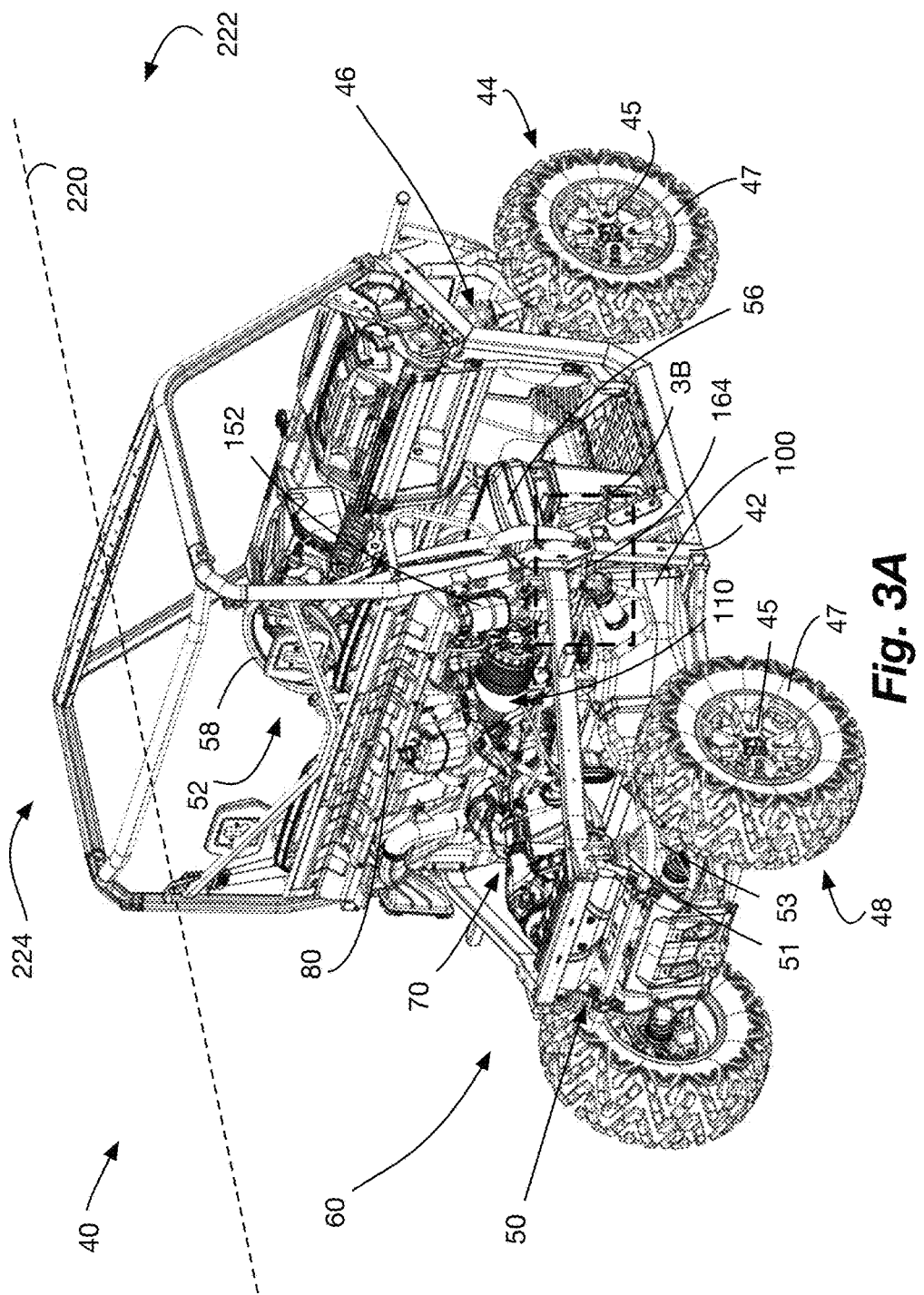
FIG. 3A is a perspective view taken from a top, rear, right side of the vehicle of FIG. 1, with the body panels and the cargo box removed.
Figure 3B:
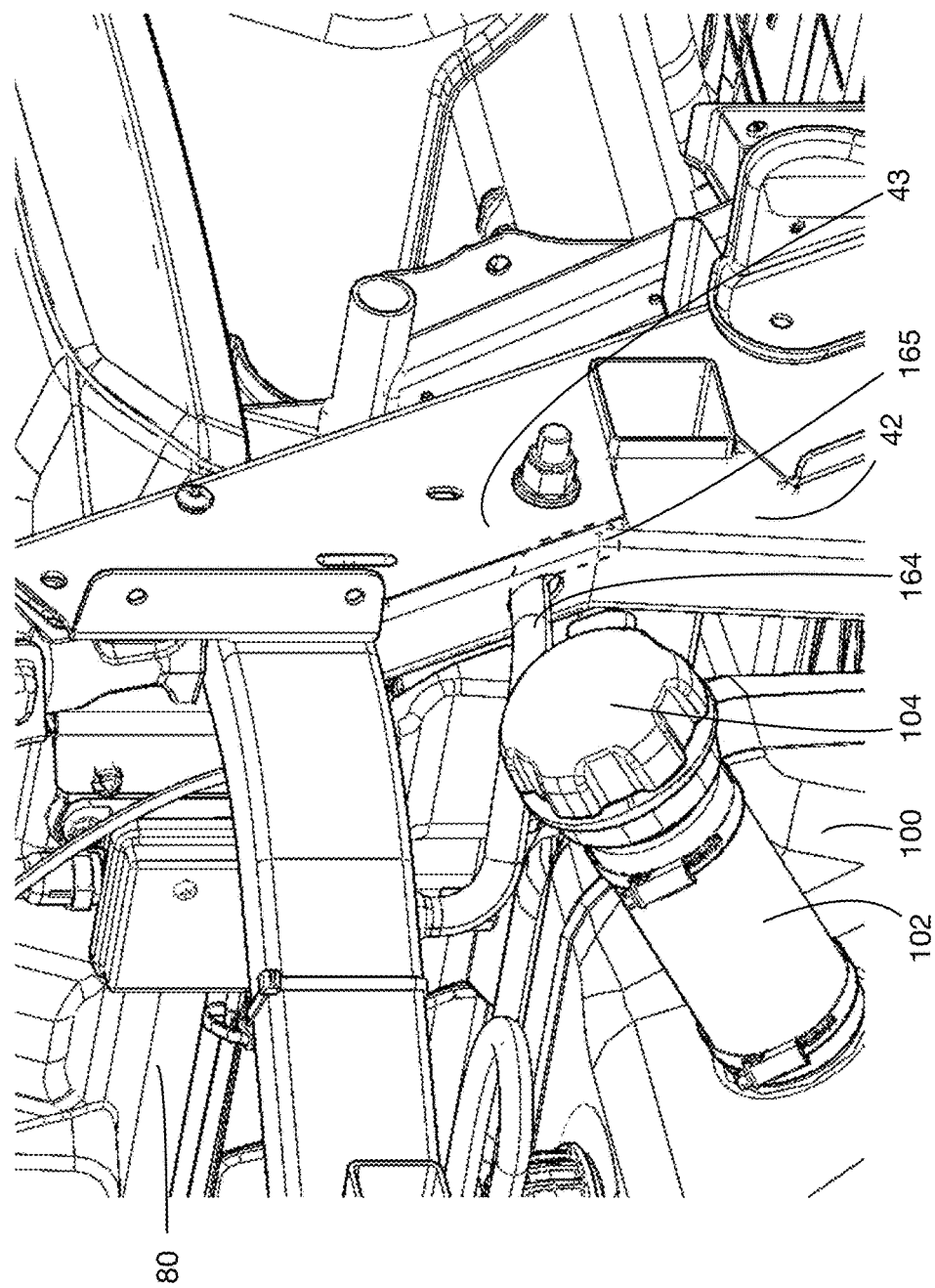
FIG. 3B is an enlarged view of portion 3B of the vehicle of FIG. 3A.

The fuel evaporation canister 152 has a fresh air port A, a tank port T, and a purge P. The fresh air port A fluidly connects to a canister vent conduit 160. The canister vent conduit 160 permits fresh air to enter the fuel evaporation canister 152 via the fresh air port A. A canister vent pre-filter 162 is fluidly connected along the canister vent conduit 160 and filters the fresh air before it enters in the fuel evaporation canister 152. The canister vent pre-filter 162 is fluidly connected to the atmosphere via a canister vent inlet tube 164. Referring to FIGS. 3A and 3B, the vent inlet tube 164 has an end 165 (shown in phantom lines in FIG. 3B) that passes through a hole in a member 43 of the frame 42, and the end 165 extends inside the member 43. The frame 42 includes members that are interconnected, such as the member 43. At least some of the members of the frame 42 have open ends and/or passages defined therein, as seen in FIG. 3B. Thus, fresh air can flow from the atmosphere into the members of the frame 42, and into the member 43. Since the end 165 is protected by the member 43, fresh air from the atmosphere that is drawn in the vent inlet tube 164 at the end 165 is more likely to be free of dirt, soil, sand and/or snow, and as a result the risks of having the vent inlet tube 164 clogged by dirt, soil, sand and/or snow are reduced.

Referring back to FIGS. 9 to 11, the purge port P fluidly connects to a canister purge conduit 170. The canister purge conduit 170 permits purged air (i.e. air containing at least some of the hydrocarbons and/or other components contained in the fuel vapors) to flow from the fuel evaporation canister 152 and on to the intake manifold 116. A filter 172 is fluidly connected along the canister purge conduit 170. A purge valve 174 and a check valve 176 are also fluidly connected along the canister purge conduit 170 downstream of the filter 172. The purge valve 174 is a solenoid valve that is movable between a closed position and an open position upon receiving an electronic signal from the ECU. A wiring harness 178 operatively connects the purge valve 174 to the ECU of the power pack 70. The check valve 176 prevents backpressure from the engine 72 that could damage the purge valve 174. A flow reducer 180 (FIG. 11) is also fluidly connected along the canister purge conduit 170, downstream of the check valve 176 and upstream of the intake manifold 116. It is contemplated that the flow reducer 180 could be omitted in certain implementations.

Tank port T fluidly connects to a fuel tank vent conduit 190. Referring to FIGS. 10 and 11, a rollover valve 200 is fluidly connected between the fuel tank 100 and a conduit 202. The rollover valve 200 prevents fuel in the fuel tank 100 from flowing into the conduit 202 in case of vehicle rollover. The conduit 202 is split into conduits 204a, 204b by a Y-shaped fitting 206a. A pressure relief valve 208 is fluidly connected along the conduit 204a. The pressure relief valve 208 permits flow of the fuel vapors from the fuel tank 100 to the fuel evaporation canister 152 when the pressure of the fuel vapors is above a threshold pressure. A check valve 210 is fluidly connected along the conduit 204b. A Y-shaped fitting 206b fluidly connects the conduits 204a, 204b to the fuel tank vent conduit 190. A fuel line 212 is fluidly connected to a fuel pump (not shown) disposed inside the fuel tank 100. The fuel line 212 fluidly communicates the fuel tank 100 with the engine 72 for delivering liquid fuel from the fuel tank 100 to the fuel injectors (not shown) of the engine 72. The check valve 210 permits air to enter the fuel tank 100 when fuel is pumped by the fuel pump.

Referring now to FIG. 11, the operation of the fuel vapor containment system 150 will be briefly described. Under certain conditions, such as when the engine 72 is not running and the fuel vapor pressure is above the pressure threshold, the fuel vapors emitted by the liquid fuel contained in the fuel tank 100 flow from the fuel tank 100 through the rollover valve 200, through the conduits 202, 204a, and then into the fuel tank vent conduit 190 and finally into the canister 152 via the tank port T. The activated carbon contained inside the canister 152 adsorbs at least some of the hydrocarbons and/or other components contained in the fuel vapors. When the engine 72 is in operation and under predetermined conditions, the purge valve 174 is moved into the open position upon receiving an electronic signal from the ECU. When the purge valve 174 is in the open position, fresh air is drawn through the canister vent inlet tube 164 via the end 165. This fresh air then flows through the pre-filter 162 and the canister vent conduit 160 and into the canister 152 via the fresh air port A. The hydrocarbons and/or other components of the fuel vapors are desorbed from the activated carbon when the fresh air flows therethrough, and the fresh air becomes purged air, which is air that contains hydrocarbons and/or other components of the fuel vapors. The purged air flows out of the canister 152 through the purge port P. From the purge port P, the purged air flows through the canister purge conduit 170. The purged air then flows through the filter 172, the purge valve 174, the check valve 176, the flow reducer 180 and into the intake manifold 116 to be fed to the engine 72.

Figure 12:
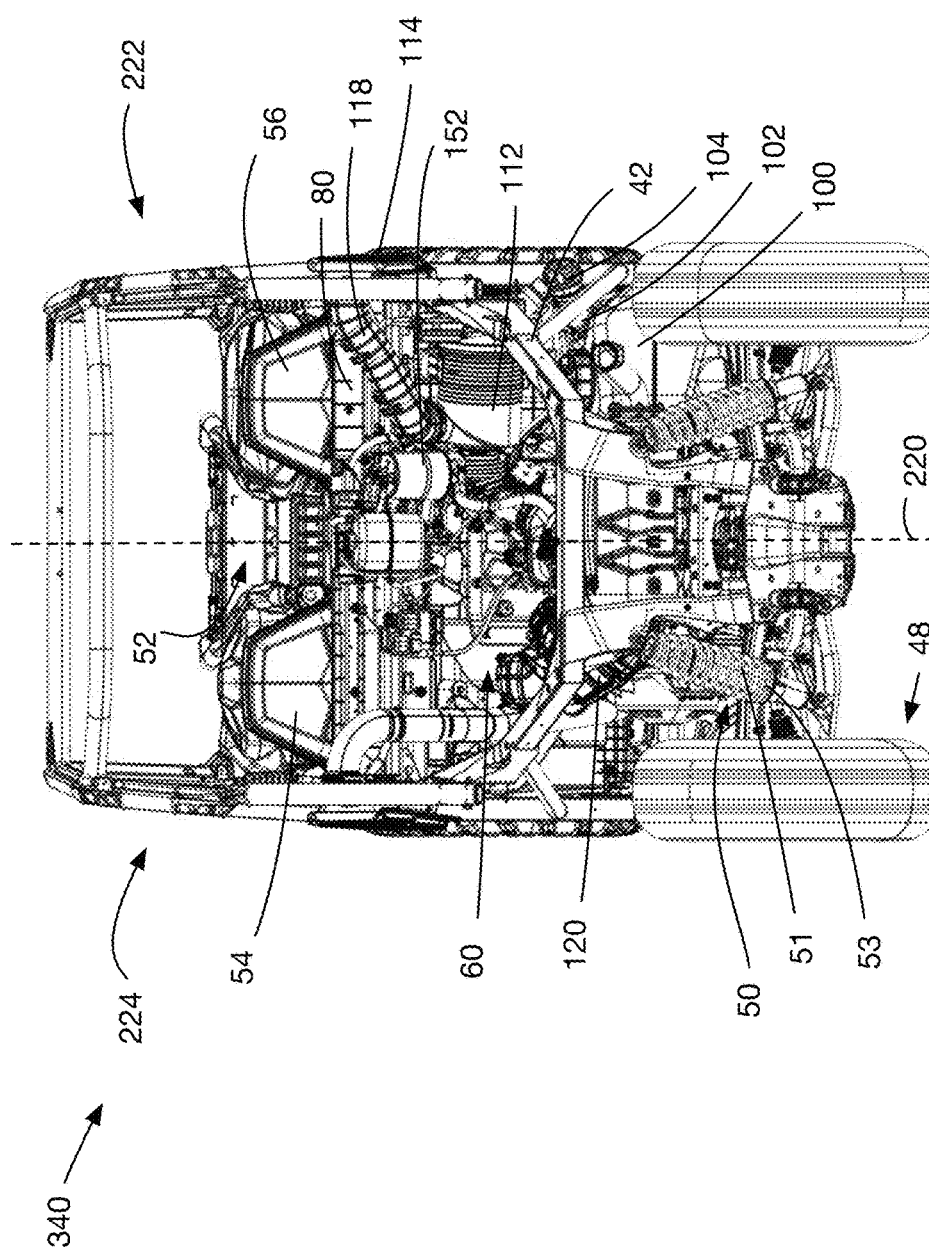
FIG. 12 is a perspective view taken from a top, rear side of a side-by-side off-road vehicle according to a second implementation of the present technology, with the body panels and a rear storage area removed.
Figure 13:
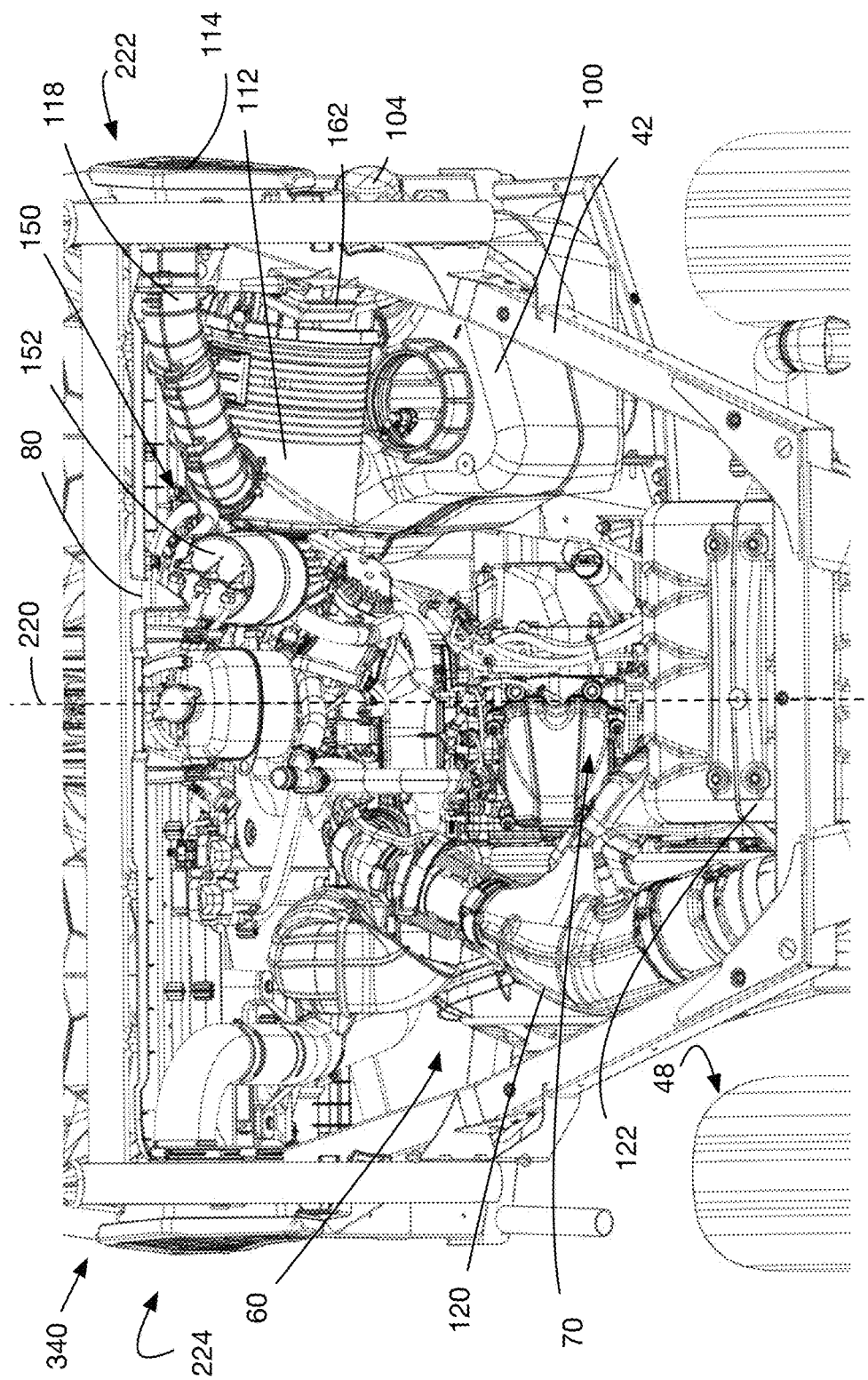
FIG. 13 is a close-up perspective view taken from a top, rear side of the power pack area of the vehicle of FIG. 12.
Figure 14:
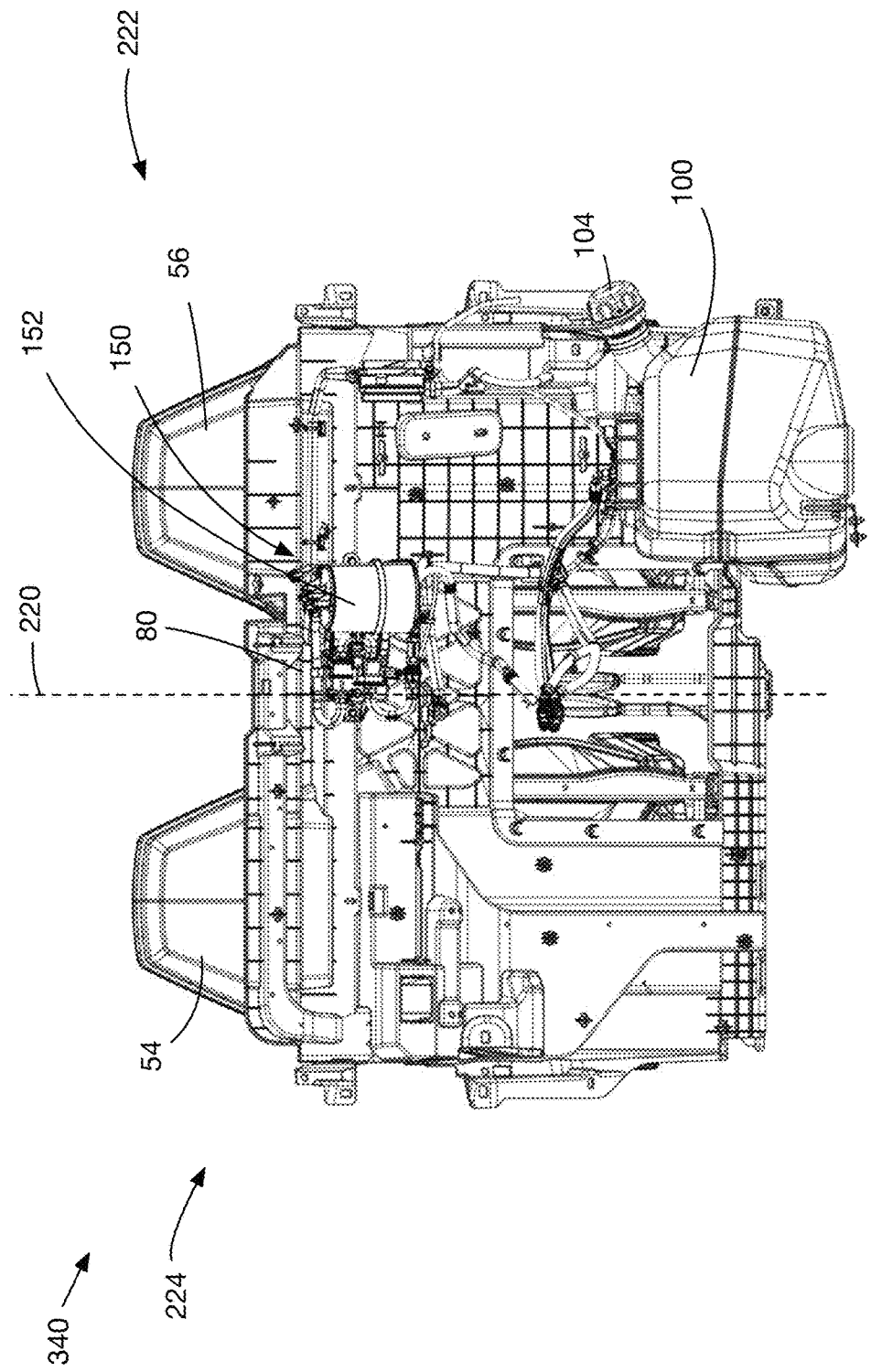
FIG. 14 is a rear elevation view of the partition, the fuel vapor containment system and the fuel tank of the vehicle of FIG. 12.

Referring now to FIGS. 12 to 14, the second implementation of a four-wheel side-by-side off-road vehicle 340 is illustrated. For simplicity, components of the vehicle 340 that are similar to those of the vehicle 40 described above with reference to FIGS. 1 to 11 have been labeled with the same reference numerals and will not be described again herein. In the vehicle 340, the canister 152 is mounted to the partition 80 as described above with reference to the vehicle 40, but at a different location. The canister 152 is still disposed on the passenger side 222 of the vehicle 340, but to the left of the air filter assembly 112. As best seen in FIGS. 12 and 13, the duct 118 extends laterally from the air filter assembly 112 toward the right side of the vehicle 340, and the inlet 114 faces toward the right side of the vehicle 340.

In the vehicle 340, the canister 152 is still disposed vertically higher than the fuel tank 100 and to the left of the filler neck 102 and the cap 104. The canister 152 is also disposed in front of the exhaust pipe 120 and the muffler 122. As best seen in FIG. 13, a portion of the muffler 122 extends laterally and behind the canister 152. As can be seen in FIG. 13, in the vehicle 340, the canister vent pre-filter 162 is mounted to the frame 42 above the fuel tank 100 and to the right of the canister 152.

Figure 16:
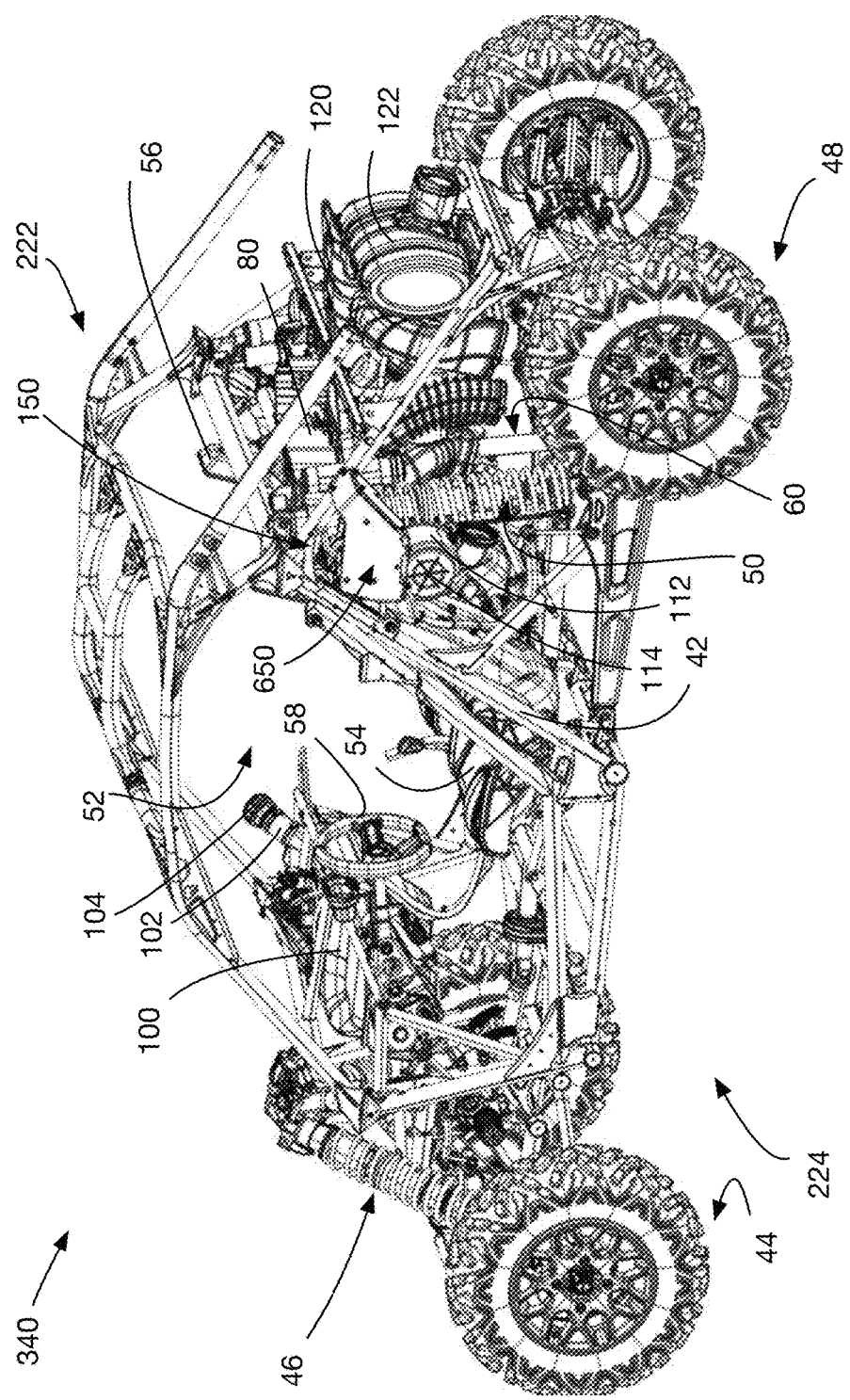
FIG. 16 is a perspective view taken from a top, rear, left side of the components of the vehicle of FIG. 15.
Figure 17:
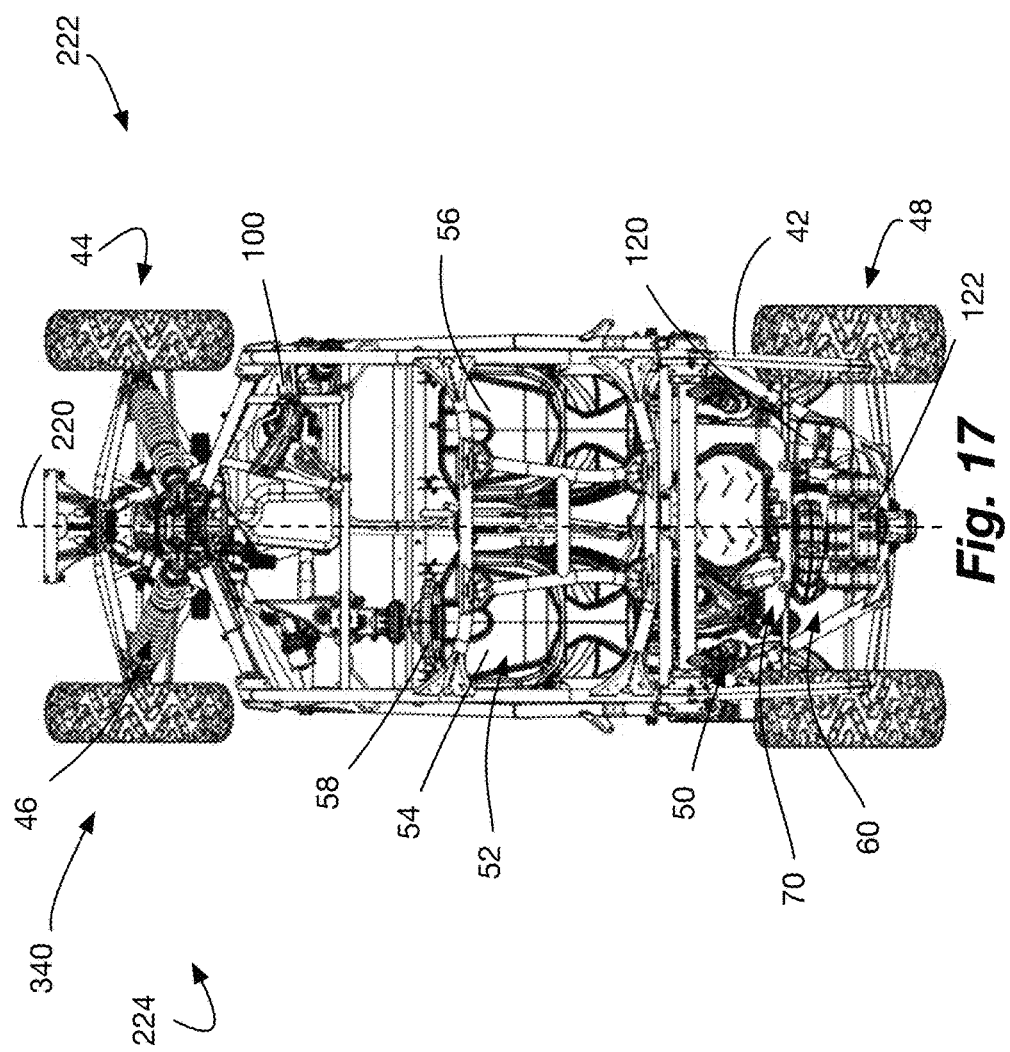
FIG. 17 is a top plan view of the components of the vehicle of FIG. 15.
Figure 18:
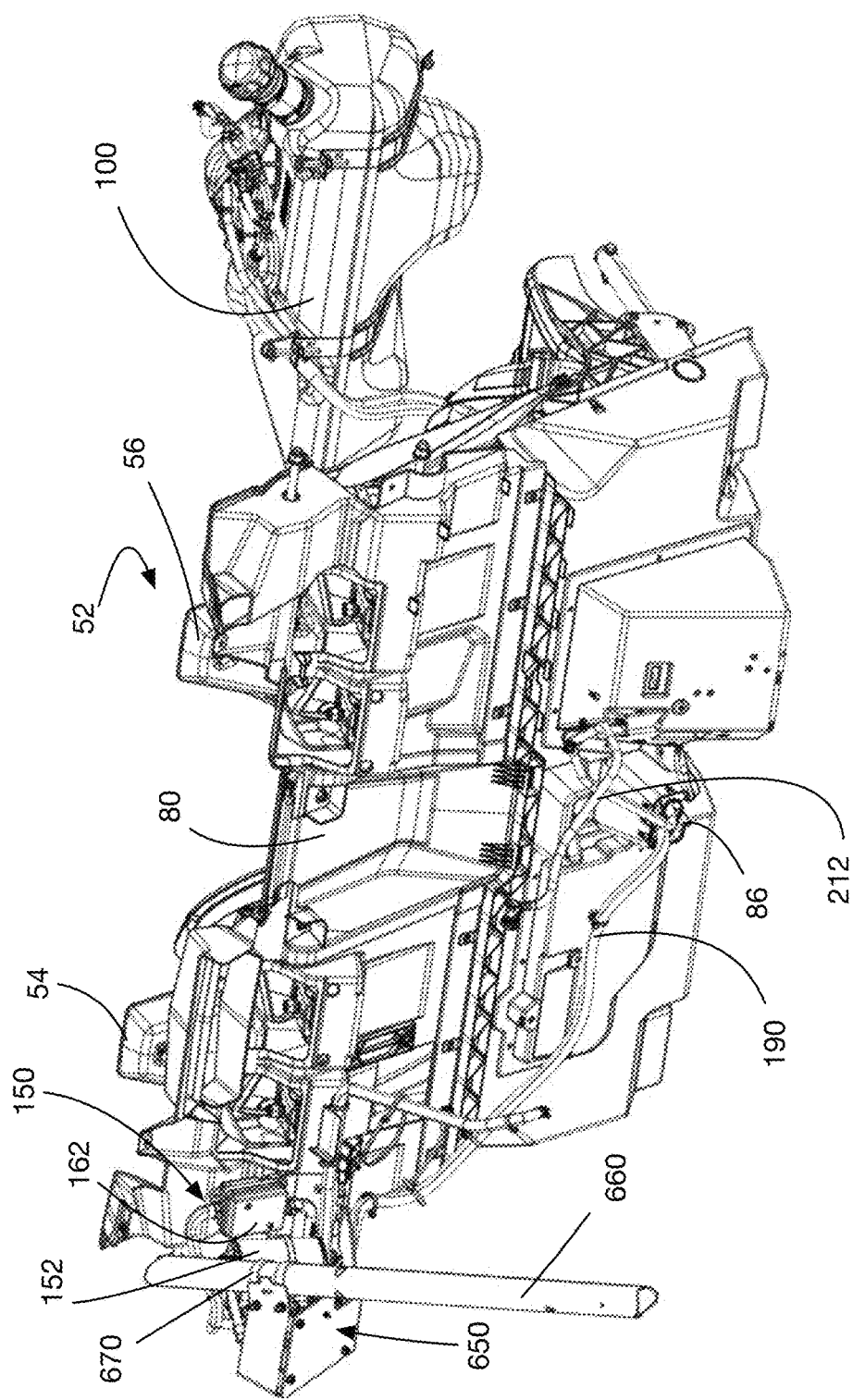
FIG. 18 is a perspective view taken from a top, rear, right side of the partition, the driver and passenger seats, the fuel vapor containment system and the fuel tank of the vehicle of FIG. 15.

Referring now to FIGS. 15 to 20, the third implementation of a four-wheel side-by-side off-road vehicle 640 is illustrated. For simplicity, components of the vehicle 640 that are similar to those of the vehicle 40 described above with reference to FIGS. 1 to 11 have been labeled with the same reference numerals and will not be described again herein. As best seen in FIG. 18, in the vehicle 640, the fuel tank 100 is disposed on the passenger side 222, forward of the passenger seat 56. The fuel line 212 and the fuel tank vent conduit 190 extend in the cockpit area 52 between the driver seat 54 and passenger seat 56, under the partition 80 via a passageway 86, and in the power pack area 60 (FIG. 18).

Figure 19:
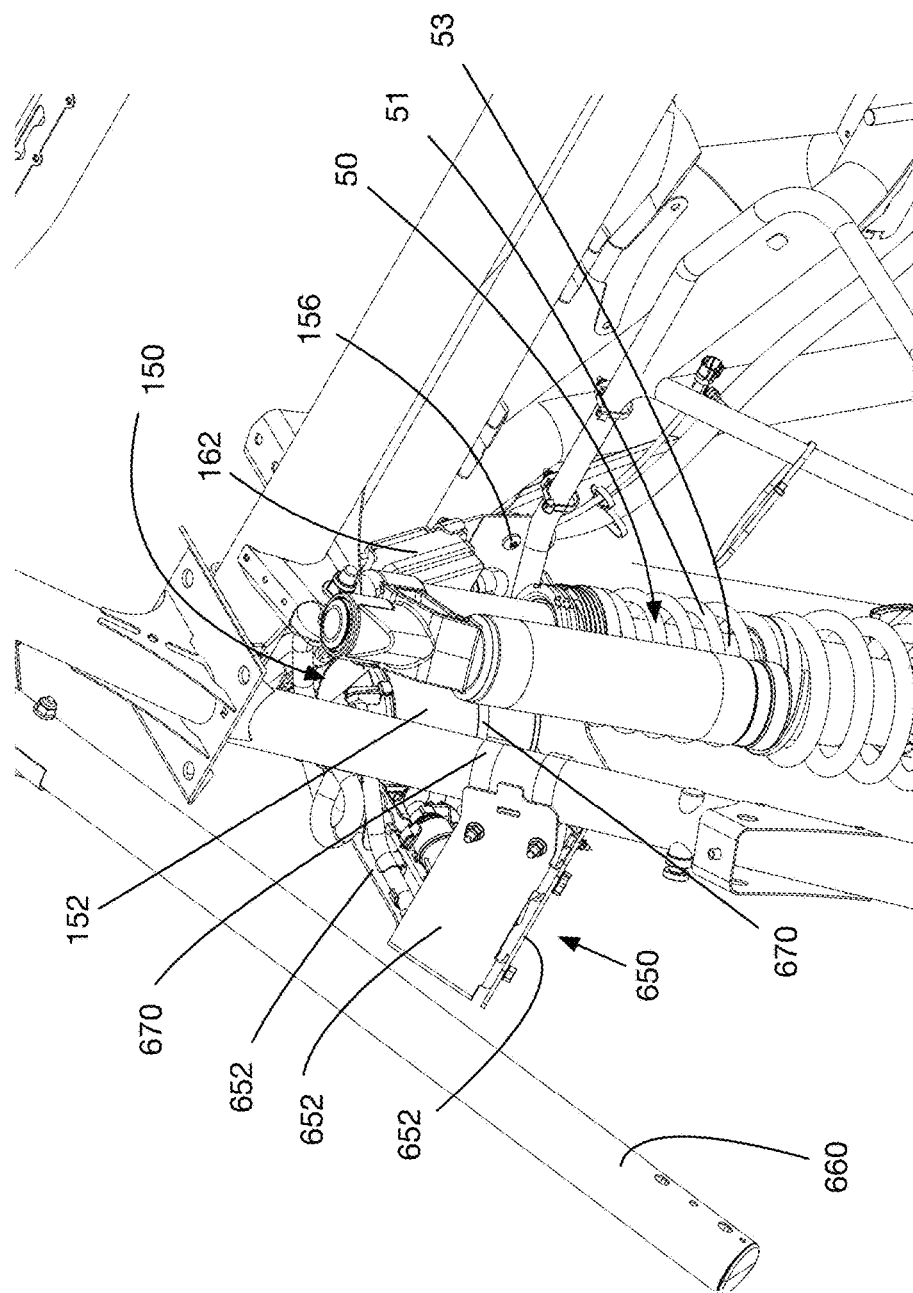
FIG. 19 is a close-up perspective view taken from a top, rear, right side of a portion of the fuel vapor containment system of the vehicle of FIG. 15.
Figure 20:
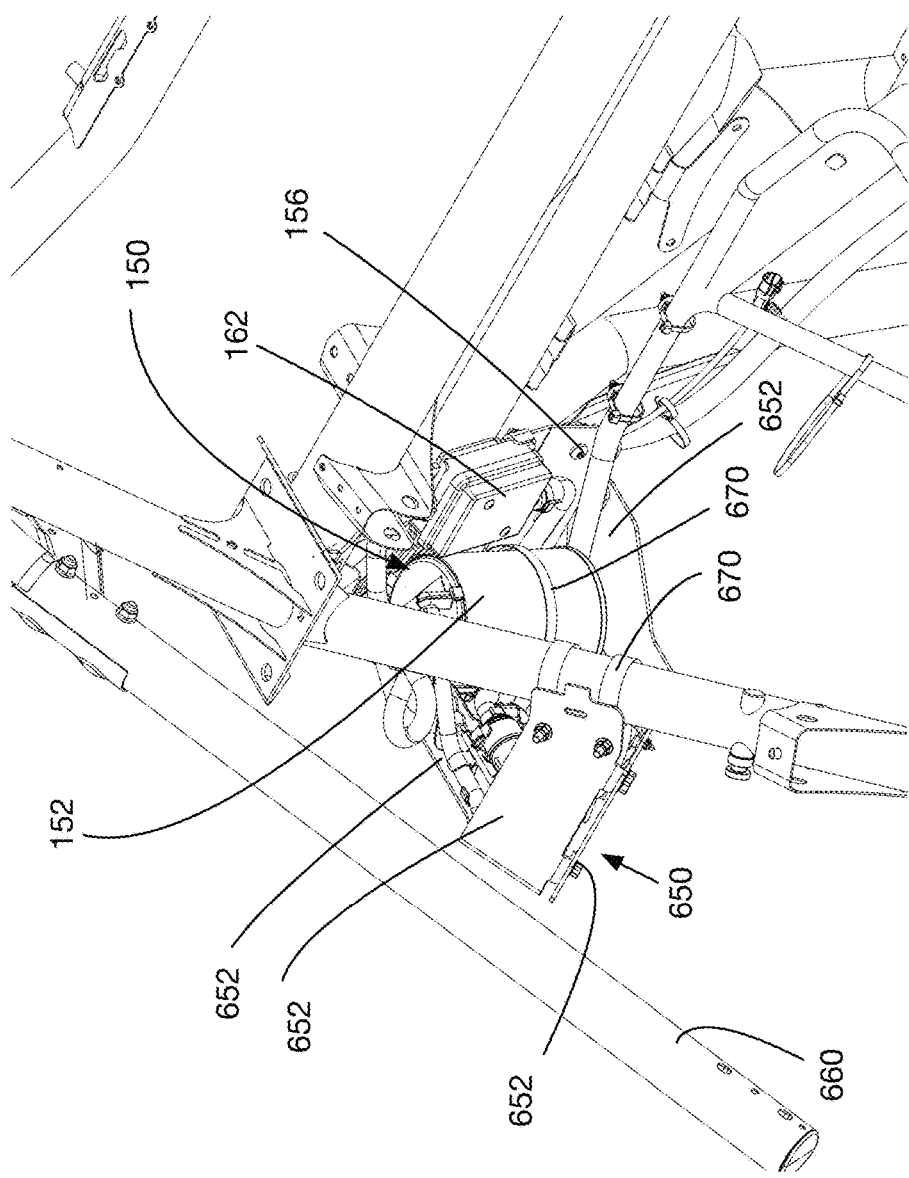
FIG. 20 is a close-up perspective view taken from a top, rear, right side of a portion of the fuel vapor containment system of the vehicle of FIG. 15, with the rear suspension assembly removed.

Referring to FIGS. 18 to 20, the canister 152 is supported in part by the partition 80 via a bracket 650. The bracket 650 is connected to the frame 42 and to the partition 80. More particularly, the bracket 650 is connected to a tubular frame member 660 of the frame 42 via collar clamps 670, and to the partition 80 via fasteners 156. The bracket 650 includes a plurality of interconnected plates 652 forming a housing for the canister 152. The plates 652 extend below, behind and to the left of the canister 152. The bracket 650 and the canister 152 are disposed on the driver side 224 of the vehicle 640, behind the driver seat 54. The pre-filter 162 is also mounted to the bracket 650 and laterally inwardly of the canister 152 (FIG. 20).

As best seen in FIG. 16, the canister 152 and the bracket 650 are disposed above the air filter assembly 112, which is disposed on the driver side 224 of the vehicle 640. In addition, the canister 152 and the bracket 650 are disposed laterally outwardly of the air filter assembly 112. Referring to FIGS. 16, 17 and 19, the canister 152 and the bracket 650 are also disposed laterally outwardly of the rear suspension assembly 50 that is located on the driver side 224 of the vehicle 640. The coil spring 51 and the shock absorber 53 are disposed to the right of the canister 152.

Figure 15:
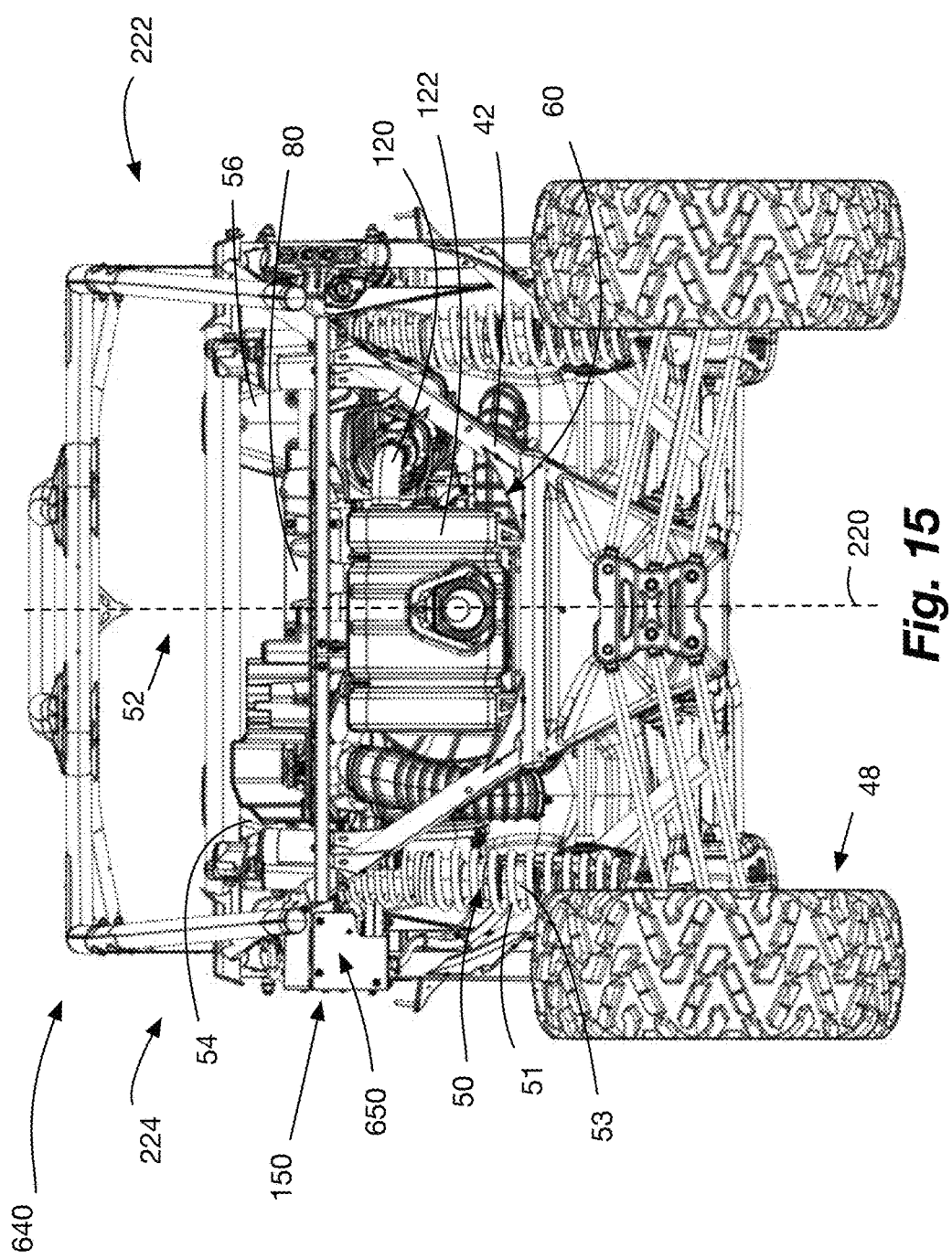
FIG. 15 is a rear elevation view of a side-by-side off-road vehicle according to a third implementation of the present technology, with the body panels and the rear storage area removed.

Referring to FIG. 15, the exhaust pipe 120 extends on the right side of the engine 72, which is on the passenger side 222. The muffler 122 extends laterally behind the engine 72. By disposing the canister 152 on the driver side 224 of the vehicle 640, the canister 152 receives only a fraction of the heat radiating from the exhaust pipe 120. In addition, since the muffler 122 extends behind the engine 72 and the canister 152 is disposed in front of the engine 72, the canister 152 receives only a fraction of the heat radiating from the muffler 122.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A side-by-side off-road vehicle comprising:
   a frame defining at least in part a cockpit area and a power pack area, the power pack area being disposed rearward of the cockpit area;
   a driver seat connected to the frame and disposed in the cockpit area, the driver seat being disposed at least in part on a first side of a longitudinal centerline of the vehicle;
   a passenger seat connected to the frame and disposed in the cockpit area, the passenger seat being disposed at least in part on a second side of the longitudinal centerline of the vehicle;
   a power pack connected to the frame and disposed at least in part in the power pack area;
   a partition connected to the frame and extending laterally across the longitudinal centerline of the vehicle, the partition separating the cockpit area from the power pack area; and
   the power pack including an internal combustion engine and a fuel vapor containment system operatively connected to the engine, the fuel vapor containment system including a fuel evaporation canister, the canister being supported at least in part by the partition.

2. The vehicle of claim 1, wherein the canister is mounted to the partition.

3. The vehicle of claim 2, wherein the canister is mounted to the partition by a bracket.

4. The vehicle of claim 1, wherein the canister is a carbon canister.

5. The vehicle of claim 1, wherein the partition includes a recess arranged and dimensioned for receiving at least partially the canister.

6. The vehicle of claim 1, wherein:
   the power pack further includes a fuel tank fluidly connected to the fuel vapor containment system;
   the fuel tank is disposed rearward of the partition;
   at least a majority of the fuel tank is disposed on the second side of the longitudinal centerline of the vehicle; and the canister is disposed on the second side of the longitudinal centerline of the vehicle.

7. The vehicle of claim 6, wherein the canister is disposed vertically higher than the at least a majority of the fuel tank.

8. The vehicle of claim 1, wherein:
the power pack further includes an exhaust pipe operatively connected to the engine;
at least a majority of the exhaust pipe extends on the first side of the longitudinal centerline of the vehicle; and
the canister is disposed on the second side of the longitudinal centerline of the vehicle.

9. The vehicle of claim 8, wherein the canister is disposed vertically higher than the at least a majority of the exhaust pipe.

10. The vehicle of claim 1, wherein:
the power pack further includes an air intake system operatively connected to the engine;
at least a majority of the air intake system extends on the second side of the longitudinal centerline of the vehicle; and
the canister is disposed on the second side of the longitudinal centerline of the vehicle.

11. The vehicle of claim 10, wherein:
the air intake system includes an air filter assembly having an inlet; and
the canister is disposed laterally outwardly of the air filter assembly.

12. The vehicle of claim 11, wherein the canister is disposed laterally outwardly of the inlet of the air filter assembly.

13. The vehicle of claim 1, further comprising a cargo box connected to the frame and disposed above the power pack area, wherein the canister is disposed longitudinally between the cargo box and the partition.

14. The vehicle of claim 3, wherein the bracket is connected between the frame and the partition.

15. The vehicle of claim 14, wherein the bracket includes a plurality of interconnected plates forming a housing for the canister.

16. The vehicle of claim 14, wherein:
the power pack further includes an exhaust pipe operatively connected to the engine;
at least a majority of the exhaust pipe extends on the second side of the longitudinal centerline of the vehicle; and
the canister is disposed on the first side of the longitudinal centerline of the vehicle.

17. The vehicle of claim 16, wherein the canister is disposed vertically higher than the at least a majority of the exhaust pipe.

18. The vehicle of claim 1, wherein:
the power pack further includes an air intake system operatively connected to the engine;
at least a majority of the air intake system extends on the first side of the longitudinal centerline of the vehicle; and
the canister is disposed on the first side of the longitudinal centerline of the vehicle.

19. The vehicle of claim 1, further comprising a rear suspension assembly pivotally connected to the frame and disposed on the first side of the longitudinal centerline of the vehicle, and wherein the canister is disposed laterally outwardly of the rear suspension assembly.

20. The vehicle of claim 1, wherein the fuel vapor containment system has a vent inlet tube fluidly connected to the fuel evaporation canister, and an end of the vent inlet tube extends inside a member of the frame.

* * * * *